(12) United States Patent
Beppu

(10) Patent No.: US 11,097,905 B2
(45) Date of Patent: Aug. 24, 2021

(54) TRANSPORT DEVICE

(71) Applicant: Azbil Corporation, Tokyo (JP)

(72) Inventor: Hisashi Beppu, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 0 days.

(21) Appl. No.: 17/046,555

(22) PCT Filed: Apr. 13, 2018

(86) PCT No.: PCT/JP2018/015616
§ 371 (c)(1),
(2) Date: Oct. 9, 2020

(87) PCT Pub. No.: WO2019/198243
PCT Pub. Date: Oct. 17, 2019

(65) Prior Publication Data
US 2021/0147159 A1    May 20, 2021

(51) Int. Cl.
*B65G 47/82* (2006.01)
*B65G 47/53* (2006.01)
(Continued)

(52) U.S. Cl.
CPC .............. *B65G 47/82* (2013.01); *B65G 47/53* (2013.01); *B65G 15/42* (2013.01); *B65G 47/082* (2013.01); *B65G 2201/0235* (2013.01)

(58) Field of Classification Search
CPC ...... B65G 47/256; B65G 47/82; B65G 47/34; B65G 47/08; B65G 47/14; B65G 47/53; B65G 47/082; F27D 3/0022
(Continued)

(56) References Cited

U.S. PATENT DOCUMENTS 2,992,717 A * 7/1961 Putman, Sr. .......... G07F 7/0609
                                                194/212
3,369,642 A * 2/1968 Hennig ................... B65B 57/04
                                                198/383
(Continued)

FOREIGN PATENT DOCUMENTS

EP      1 717 533 B1     7/2013
JP     H01-180422 U     12/1989
(Continued)

OTHER PUBLICATIONS

International Search Report received for PCT Patent Application No. PCT/JP2018/015616, dated May 29, 2018, 4 pages (2 pages of English Translation of International Search Report and 2 pages of International Search Report).

*Primary Examiner* — James R Bidwell

(57) ABSTRACT

A transport device including a support body having an upper part on which a plurality of articles can be arranged; an unloading device which pushes the plurality of articles arranged on the support body; a belt conveyor which transports the articles pushed out from the support body; a slider which moves the articles arranged on the support body and also moves the articles arranged on the conveyor belt, thereby separating the articles; and a lift which is disposed between the support body and the conveyor belt and which rises to a higher position than the upper surfaces of both the support body and the conveyor belt when the articles arranged on the support body and the articles arranged on the conveyor belt have been separated.

10 Claims, 25 Drawing Sheets

(51) Int. Cl.
*B65G 15/42* (2006.01)
*B65G 47/08* (2006.01)

(58) Field of Classification Search
USPC .......................................... 198/429, 431, 432
See application file for complete search history.

(56) References Cited

U.S. PATENT DOCUMENTS

| | | | | |
|---|---|---|---|---|
| 3,610,399 | A * | 10/1971 | Friedrich | B65G 47/256 |
| | | | | 198/398 |
| 3,987,889 | A * | 10/1976 | Godoy | B65G 47/82 |
| | | | | 198/429 |
| 4,339,028 | A * | 7/1982 | Meacle | G01G 19/03 |
| | | | | 177/119 |
| 6,419,442 | B1 * | 7/2002 | O'Brien | B65G 47/82 |
| | | | | 414/790.3 |
| 2009/0208320 | A1 | 8/2009 | Wagner et al. | |
| 2012/0279828 | A1 | 11/2012 | Eschlbeck | |
| 2016/0304291 | A1 | 10/2016 | Strauch et al. | |

FOREIGN PATENT DOCUMENTS

| | | |
|---|---|---|
| JP | H04-58518 A | 5/1992 |
| JP | H04-115817 U | 10/1992 |
| JP | H06-24567 A | 2/1994 |
| JP | 2001-097547 A | 4/2001 |
| JP | 2010-006555 A | 1/2010 |
| JP | 2013-220870 A | 10/2013 |
| JP | 2016-539060 A | 12/2016 |
| WO | 2015/082563 A1 | 6/2015 |

* cited by examiner

TRANSPORT DEVICE

CROSS-REFERENCE TO RELATED APPLICATIONS

This application is a National Stage entry under 35 U.S.C. 371 of International Patent Application No. PCT/JP2018/015616, filed on Apr. 13, 2018, the entire contents of which are incorporated by reference herein.

TECHNICAL FIELD

The present invention relates to a transport device.

BACKGROUND ART

For example, when manufacturing products such as pharmaceutical products and food products, containers may be stored in an oven to apply temperature treatment or pressure treatment, such as freeze-drying treatment, to contents in the containers. A conveyor is disposed in front of the oven. The conveyor transports containers to be carried into the oven and containers discharged from the oven (for example, see Patent Literatures 1 to 3).

Patent Literature 1 proposes a method of transferring a row of containers onto a conveyor by inserting a thin sheet from a conveyor side under a row of containers closest to the conveyor among a plurality of the containers arranged on a plate and pulling the sheet.

Patent Literature 2 proposes a method of securing a row of containers adjacent to the row of containers pushed out onto the conveyor on the plate by a suction device to prevent the containers in the adjacent row of containers from being pulled out and mixed into the row of containers pushed out onto the conveyor when the containers are discharged by pushing out from an oven via the plate onto a conveyor.

Patent Literature 3 proposes a method of pushing a row of containers from a plurality of the containers arranged on a plate onto a conveyor, and then moving the plate with the containers arranged thereon upward or moving the conveyor downward to prevent the containers on the plate from coming into contact with the conveyor.

CITATION LIST

Patent Literature

PTL 1: EP1717533B
PTL 2: WO2015/082563A
PTL 3: US2009/208320A

SUMMARY OF INVENTION

Technical Problem

If some of containers pushed out of an oven onto a conveyor fall over, such fallen container (s) may impede discharging of other containers when the conveyor is activated. In addition, not only for steps of manufacturing pharmaceutical products or food products, a technology which enables transport of a plurality of articles to the conveyor while avoiding an influence of the fallen articles is required. Accordingly, it is one of objects of the present invention to provide a transport device capable of transporting the plurality of articles onto the conveyor while avoiding an influence of the fallen articles.

Solution to Problem

According to an aspect of the present invention, there is provided a transport device including: a support configured to allow a plurality of articles to be arranged on top; a discharging device configured to push the plurality of articles arranged on the support; a conveyor belt configured to transport the articles pushed out from the support; and a slider configured to move the articles to position the articles arranged on the support apart from the articles arranged on the conveyor belt; and a lift disposed between the support and the conveyor belt and configured to move upward to a position higher than upper surfaces of the support and the conveyor belt when the articles arranged on the support and the articles arranged on the conveyor belt are positioned apart from each other.

In the transport device described above, the lift may be stored at a position lower than positions of the upper surfaces of the support and the conveyor belt while the plurality of articles are pushed out onto the conveyor belt from the support.

In the transport device described above, the discharging device may push the plurality of articles until at least part of articles which are to be moved by the slider and have not fallen over are positioned on the stored lift.

In the transport device described above, the slider may position the articles arranged on the support and the articles arranged on the conveyor belt apart from each other to form a space to allow the lift moving upward to enter between the unfallen articles on the support and the unfallen articles on the conveyor belt.

In the transport device described above, the slider may move the articles arranged on the conveyor belt in a direction identical to a discharging direction of the discharging device so that the articles arranged on the conveyor belt are positioned apart from the articles arranged on the support.

In the transport device described above, the slider may move the conveyor belt in a direction identical to the direction in which the discharging device discharges the articles and position the conveyor belt apart from the support.

In the transport device described above, the slider may have a contact part that comes into contact with an underside surface structure of the conveyor belt, and the conveyor belt may be positioned apart from the support by the contact part of the slider pushing the underside surface structure of the conveyor belt.

In the transport device described above, the underside surface structure of the conveyor belt is a protrusion, and the conveyor belt may be positioned apart from the support by pushing the protrusion on an underside surface of the conveyor belt by the contact part of the slider.

The transport device described above may further include an eccentric cam for moving the slider.

The transport device described above may further include a gear configured to guide the position of the conveyor belt and the conveyor belt may be moved by moving the gear by the slider.

In the transport device described above, the conveyor belt may be made of an elastic material. The conveyor belt may include a chain.

In the transport device described above, the lift moving upward may move articles fallen across the support and the conveyor belt onto the support or the conveyor belt.

In the transport device described above, the shape of the lift may be a plate shape.

The transport device described above may further include a separation guide configured to separate the unfallen articles from the fallen articles on the conveyor belt.

According to an aspect of the present invention, there is provided an oven system including: an oven; a plate disposed in the oven; a discharging device configured to push a plurality of the articles arranged on the plate; a bridge disposed adjacent to the plate; a conveyor belt disposed adjacent to the bridge and disposed outside of the oven for transporting the articles pushed out from the plate; a slider configured to move the articles to position the articles arranged on the bridge apart from the articles arranged on the conveyor belt; and a lift disposed between the bridge and the conveyor belt and configured to move upward to a position higher than upper surfaces of the bridge and the conveyor belt when the articles arranged on the bridge and the articles arranged on the conveyor belt are positioned apart from each other.

In the oven system described above, the lift may be stored at a position lower than the upper surfaces of the bridge and the conveyor belt while the plurality of articles are pushed out onto the conveyor belt from the bridge.

In the oven system described above, the discharging device may push the plurality of articles until at least part of articles which are to be moved by the slider and have kept unfallen are positioned on the stored lift.

In the oven system described above, the slider may position the articles arranged on the bridge apart from the articles arranged on the conveyor belt to forma space to allow the lift moving upward to enter between the unfallen articles on the bridge and the unfallen articles on the conveyor belt.

In the oven system described above, the slider may move the articles arranged on the conveyor belt in a direction identical to the discharging direction of the discharging device so that the articles arranged on the conveyor belt are positioned apart from the articles arranged on the bridge.

In the oven system described above, the slider may move the conveyor belt in a direction identical to the direction in which the discharging device pushes the articles and positions the conveyor belt apart from the bridge.

In the oven system described above, the slider may have the contact part that comes into contact with an underside surface structure of the conveyor belt, and the conveyor belt may be positioned apart from the bridge by the contact part of the slider pushing the underside surface structure of the conveyor belt.

In the oven system described above, the underside surface structure of the conveyor belt is a protrusion, and the conveyor belt may be separated from the bridge by pushing the protrusion on the underside surface of the conveyor belt by the contact part of the slider.

The oven system described above may further include an eccentric cam for moving the slider.

The oven system described above may further include a gear configured to guide a position of the conveyor belt and the conveyor belt may be moved by moving the gear by the slider.

In the oven system described above, the conveyor belt may be an elastic body. The conveyor belt may include a chain.

In the oven system described above, the lift moving upward may move the articles fallen across the bridge and the conveyor belt onto the bridge or the conveyor belt.

In the oven system described above, the shape of the lift may be a plate shape.

The oven system described above may further include a separation guide configured to separate the unfallen articles from the fallen articles on the conveyor belt.

In the oven system described above, the articles may be vials and the oven system may further include an upper plate disposed above the plate in the oven and configured to come into contact with upper parts of caps of the vials halfway closed by caps to completely close the vials.

In the oven system described above, the oven may be a freeze dry oven.

Advantageous Effects of Invention

The present invention can provide a transport device capable of transporting a plurality of articles onto a conveyor while avoiding an influence of fallen articles.

DESCRIPTION OF EMBODIMENTS

Figure 1:
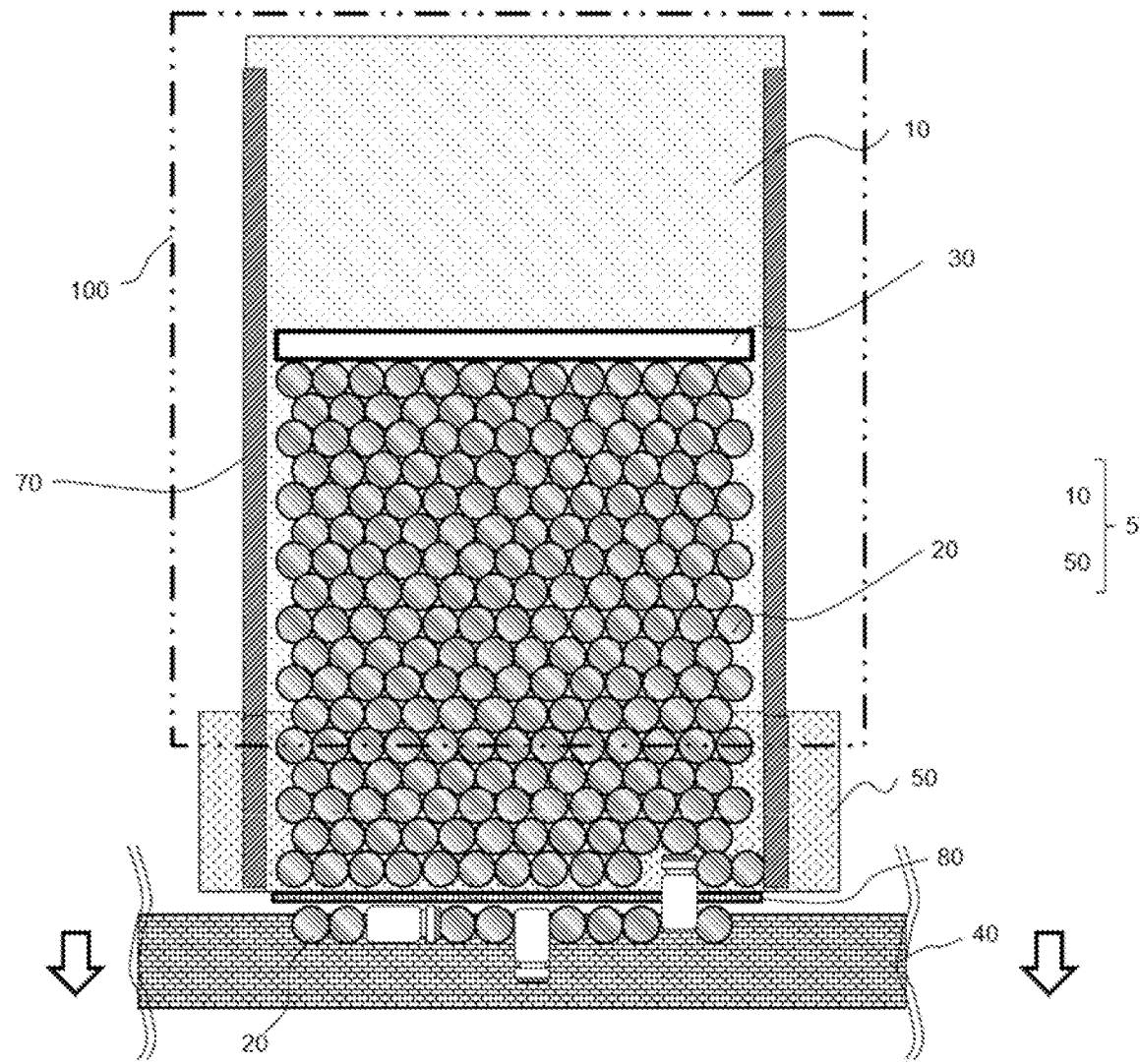
FIG. 1 is a schematic top view of a transport device according to a first embodiment.

An embodiment of the present invention will be described below. In the drawings, the same or similar parts are designated by the same or similar reference signs. However, the drawings are schematic illustrations. Therefore, specific dimensions or the like are to be determined based on the following description. In addition, the drawings may include parts having different dimensional relationships and ratios from each other as a matter of course.

First Embodiment

A transport device according to a first embodiment includes, as illustrated in FIG. 1, a support 5 configured to allow a plurality of articles 20 to be arranged on top; a discharging device 30 configured to push the plurality of articles 20 arranged on the support 5; a conveyor belt 40 configured to transport the articles pushed out from the support 5; a slider configured to move the articles 20 to position the articles 20 arranged on the support 5 apart from the articles 20 arranged on the conveyor belt 40; and a lift 80 configured to move upward to a position higher than upper surfaces of the support 5 and the conveyor belt 40 when the articles 20 arranged on the support 5 and the articles 20 arranged on the conveyor belt 40 are positioned apart from each other.

Figure 2:
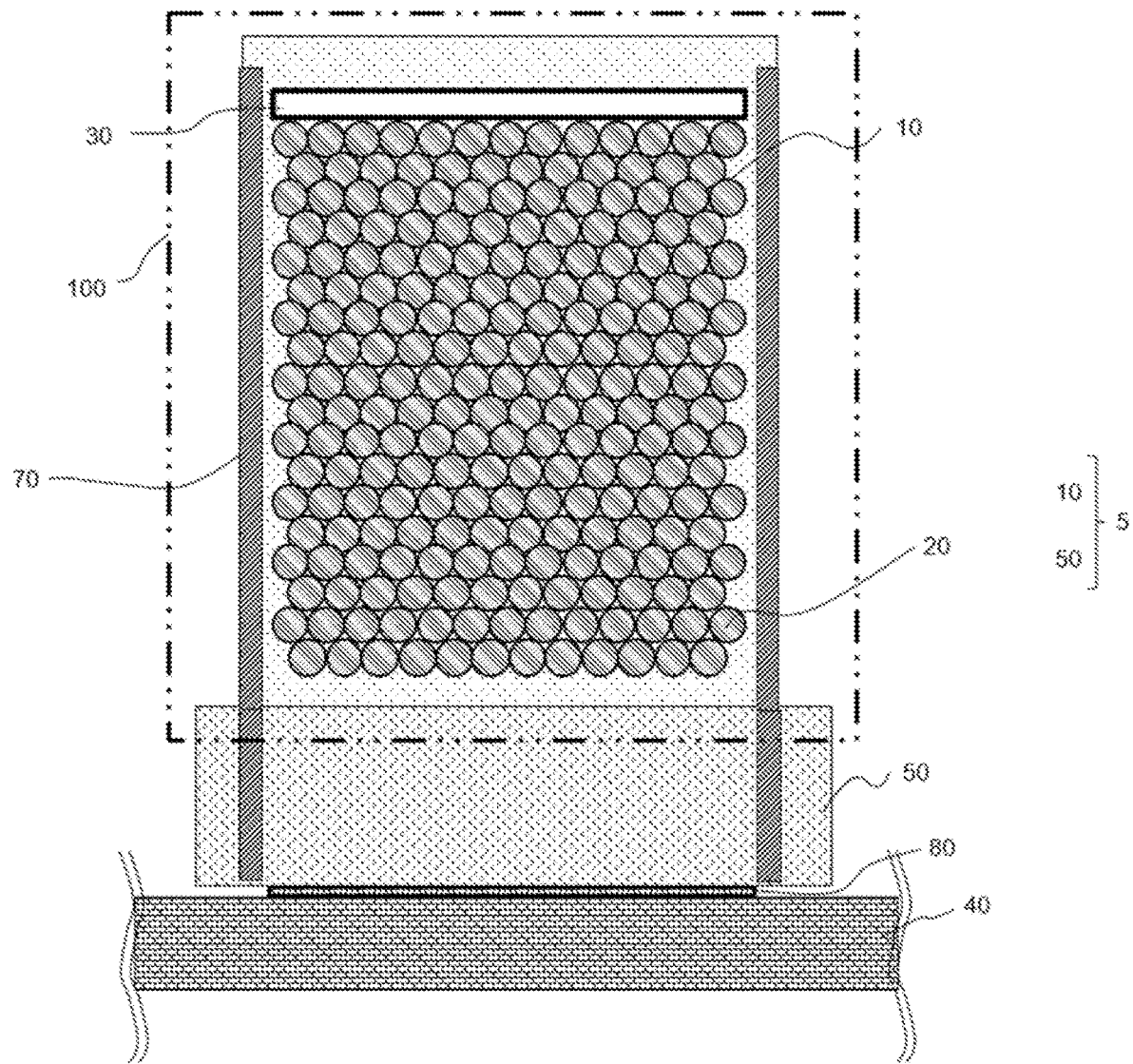
FIG. 2 is a schematic top view of the transport device according to the first embodiment.

The support 5 includes, as illustrated in FIG. 2, a plate 10 disposed in a closed space 100, and a bridge 50 of which at least a part is disposed out of the closed space 100. The bridge 50 is disposed between the plate 10 and the conveyor belt 40. The closed space 100 may be provided, for example, by an oven, a tank, a storage room, and the like. In the closed space 100, at least one of a temperature and a pressure may be controlled. In the closed space 100, at least one of temperature distribution and pressure distribution may be controlled. The oven may be a freeze dry oven. The closed space 100 may be released by a door or the like. In the following description, an example in which the oven is a freeze dry oven will be described.

Each of the plurality of articles 20 is, but not specifically limited to, a container, such as a vial, that stores pharmaceutical products to be subject, for example, to treatment such as freeze drying. In the following description, an example in which the articles 20 are vials will be described. Each of the plurality of articles 20 includes, for example, a cylindrical shape. The plurality of articles 20 may be arranged in a staggered manner (staggered arrangement) such that a larger number of articles 20 can be arranged on the plate 10. In this case, the plurality of articles 20 are arranged in an overlapped manner when viewed from a side of a direction of travel of the discharging device 30. The plurality of articles 20 are arranged such that centers are alternating with each other by row extending substantially parallel to the conveyor belt 40 when viewed from above.

For example, the respective centers of the articles 20 in a second row are shifted with respect to the respective centers of the articles 20 in a first row on a conveyor belt 40 side in a direction of the row. However, the respective centers of the articles 20 in a third row are not generally shifted with respect to the respective centers of the articles 20 in the first row in the direction of the row. The centers of the plurality of articles 20 may be recognized as being arranged at intersections of a triangle grid pattern. However, in this disclosure, a triangle forming the triangle grid pattern may be, and may not be a regular triangle.

Figure 3A:
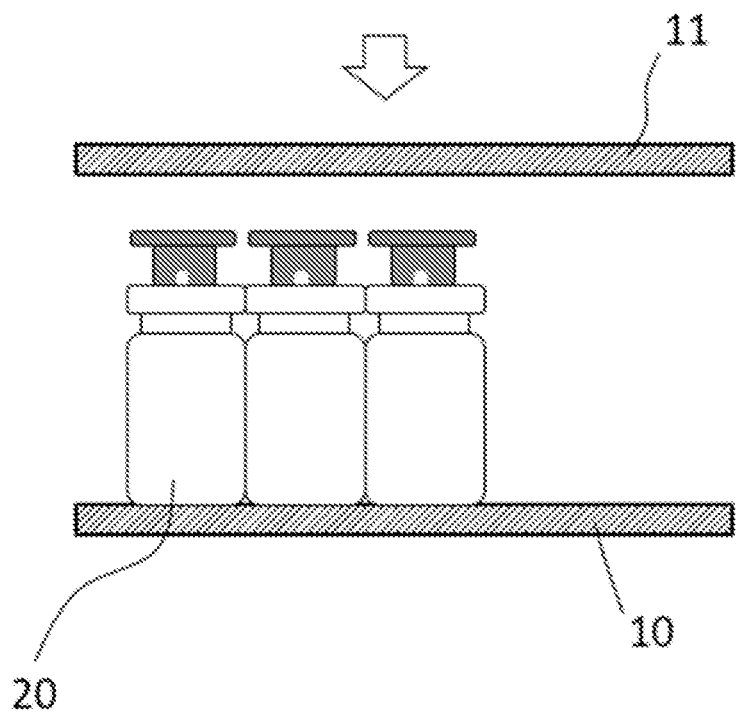
FIGS. 3A and 3B are schematic side views of the transport device according to the first embodiment.
Figure 3B:
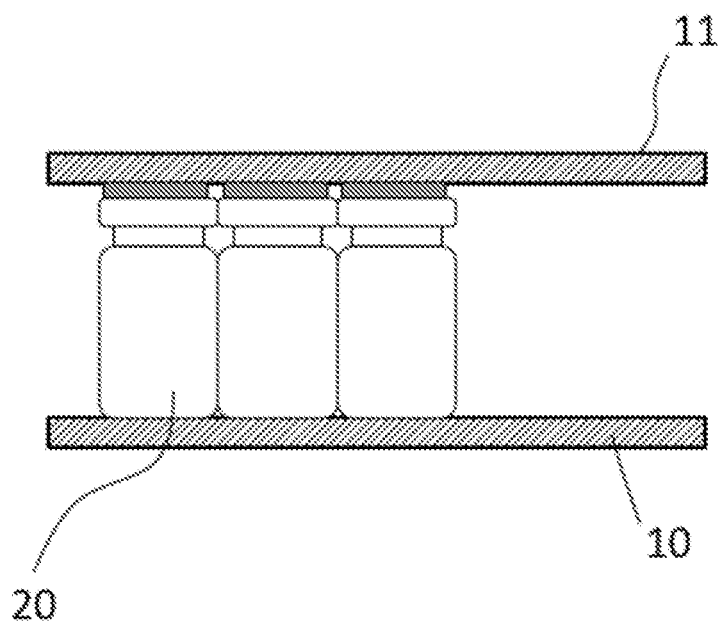
Figure 4A:
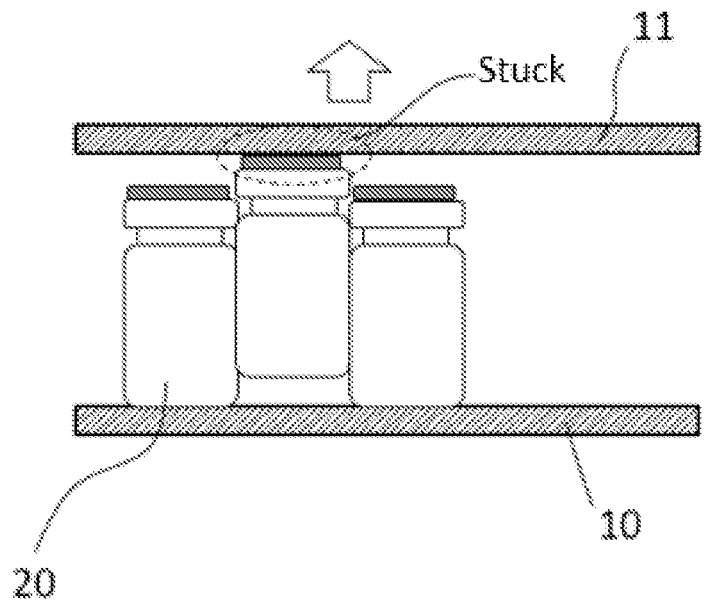
FIGS. 4A and 4B are schematic side views of the transport device according to the first embodiment.
Figure 4B:
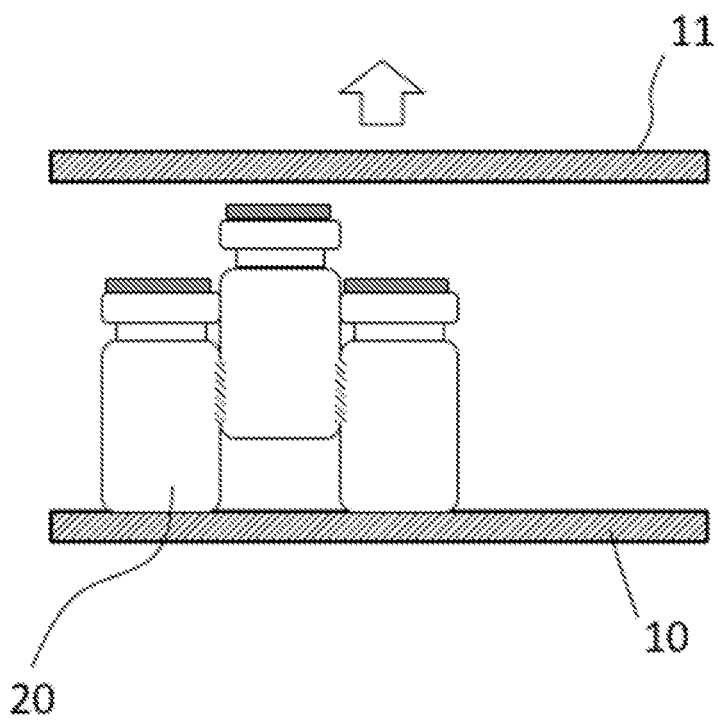

The articles 20, which are vials containing a drug therein, are carried into the freeze dry oven on the plate 10 in a state of being halfway closed. The cap is made, for example, of an elastic material such as rubber. When a drug in an interior is freeze dried, an upper plate 11 disposed above the plate 10 in the freeze dry oven moves downward and presses the caps, which halfway close the vials, to completely close the vials, as illustrated in FIGS. 3A and 3B. Alternatively, the vials may be closed completely by moving the plate 10 upward toward the upper plate 11 to bring the upper parts of the caps into contact with the upper plate 11. Then, as illustrated in FIGS. 4A and 4B, the upper plate 11 is moved upward so that the vials can be discharged from the freeze dry oven. Alternatively, the plate 10 may be moved downward so that the vials can be discharged from the freeze dry oven.

Figure 5A:
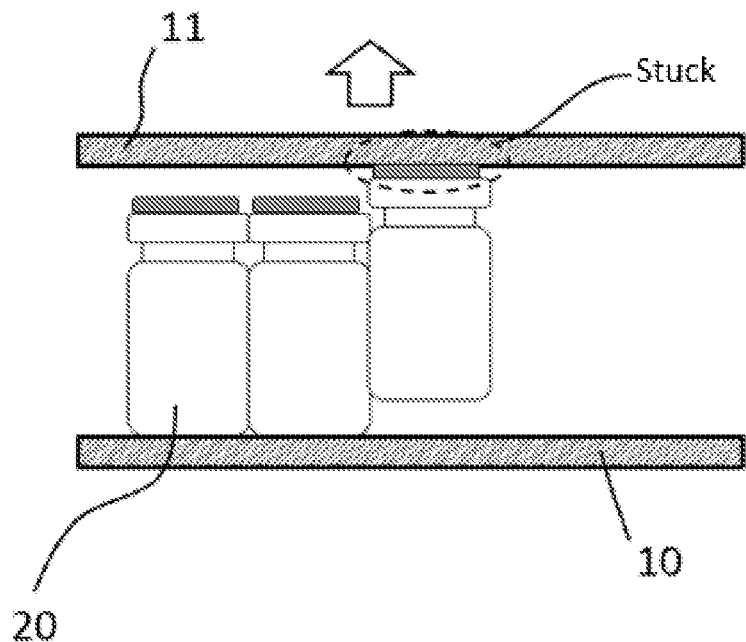
FIGS. 5A and 5B are schematic side views of the transport device according to the first embodiment.
Figure 5B:
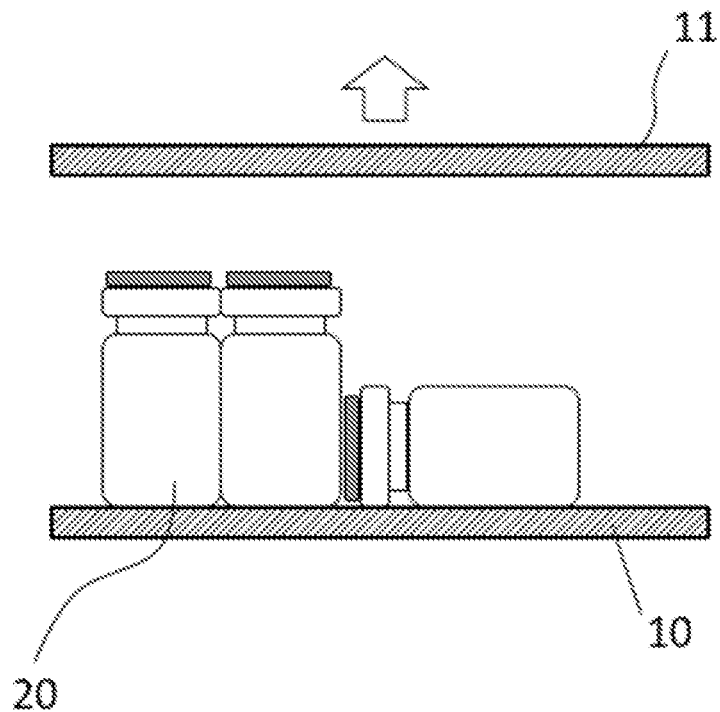

When the plate 10 and the upper plate 11 moves relatively away from each other, the caps of some vials stick fast to the upper plate 11, and the some of the vials may be pulled up by the upper plate 11. In this situation, the vial surrounded by other vials tends to drop to its original position without being fallen over, or to be held by the surrounding vials standing upright in a state of being suspended without being fallen over even when pulled up by the upper plate 11, as illustrated in FIG. 4B. In contrast, as illustrated in FIGS. 5A and 5B, the vial which is not surrounded by other vials, like the vial in the first row on the conveyor belt 40 side, tends to drop and fall down when pulled up by the upper plate 11.

Figure 6:
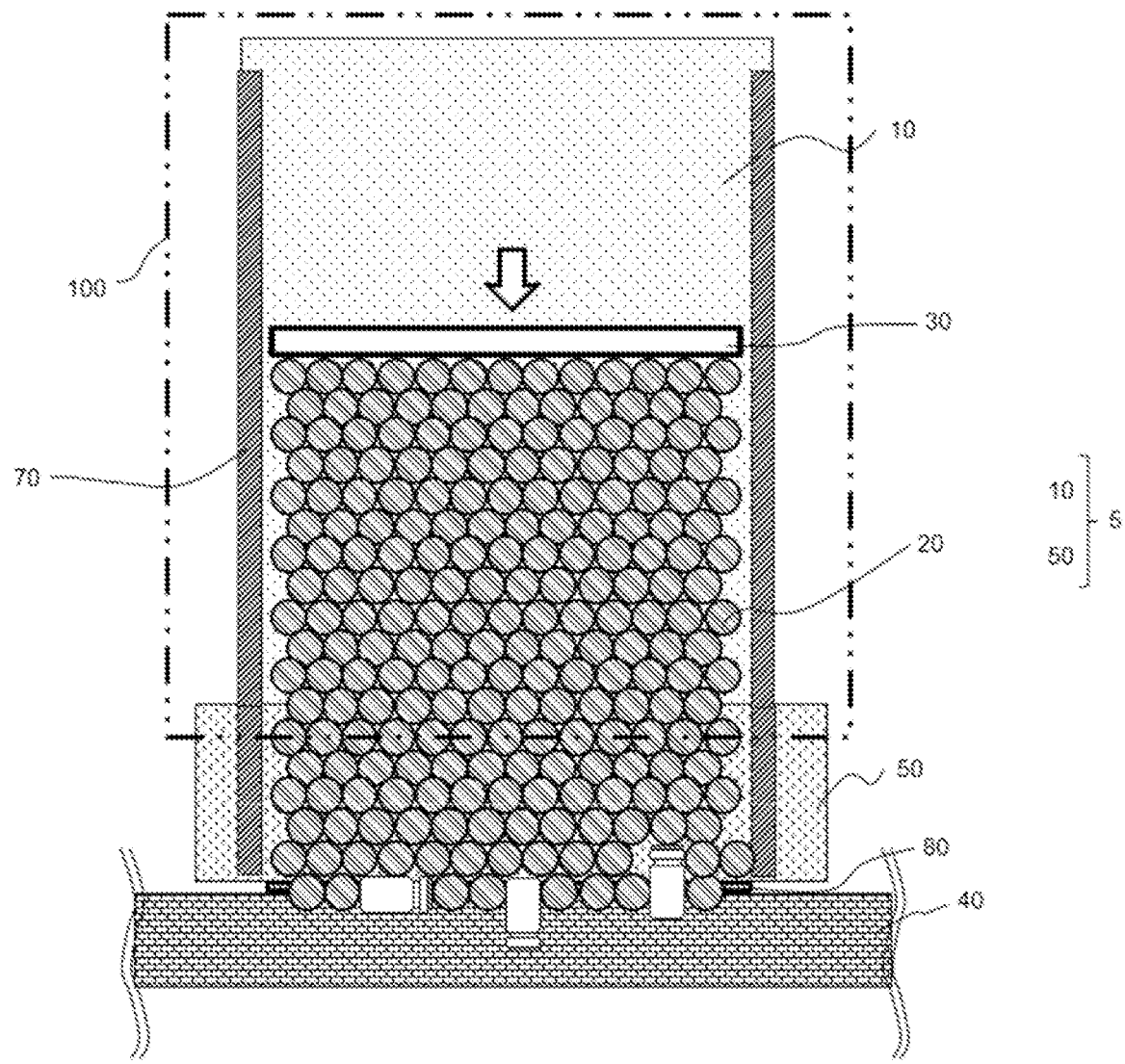
FIG. 6 is a schematic top view of the transport device according to the first embodiment.

When taking the plurality of articles 20 from the closed space 100 after the caps are completely closed, a door of the oven, or the like, that provides the closed space 100 is opened, as illustrated in FIG. 6. In addition, the discharging device 30 pushes out the plurality of articles 20 on the plate 10 toward the conveyor belt 40 via the bridge 50. The discharging device 30 has, for example, a shape capable of coming into contact with an innermost row of the plurality of articles 20 in the closed space 100. In other words, the discharging device 30 has a shape capable of coming into contact with the row of the articles 20 on a side opposite from the conveyor belt 40 among the plurality of articles 20 on the plate 10. The shape of the discharging device 30 is, for example, a bar. A direction of pushing the articles 20 by the discharging device 30 is, for example, parallel to upper surfaces of the plate 10 and the bridge 50, and perpendicular to a direction of transport of the conveyor belt 40. A guide 70 may be provided in a vicinity of the plate 10 and the bridge 50 to prevent the articles 20 pushed by the discharging device 30 from spreading laterally with respect to the direction of travel of the discharging device 30.

Figure 7:
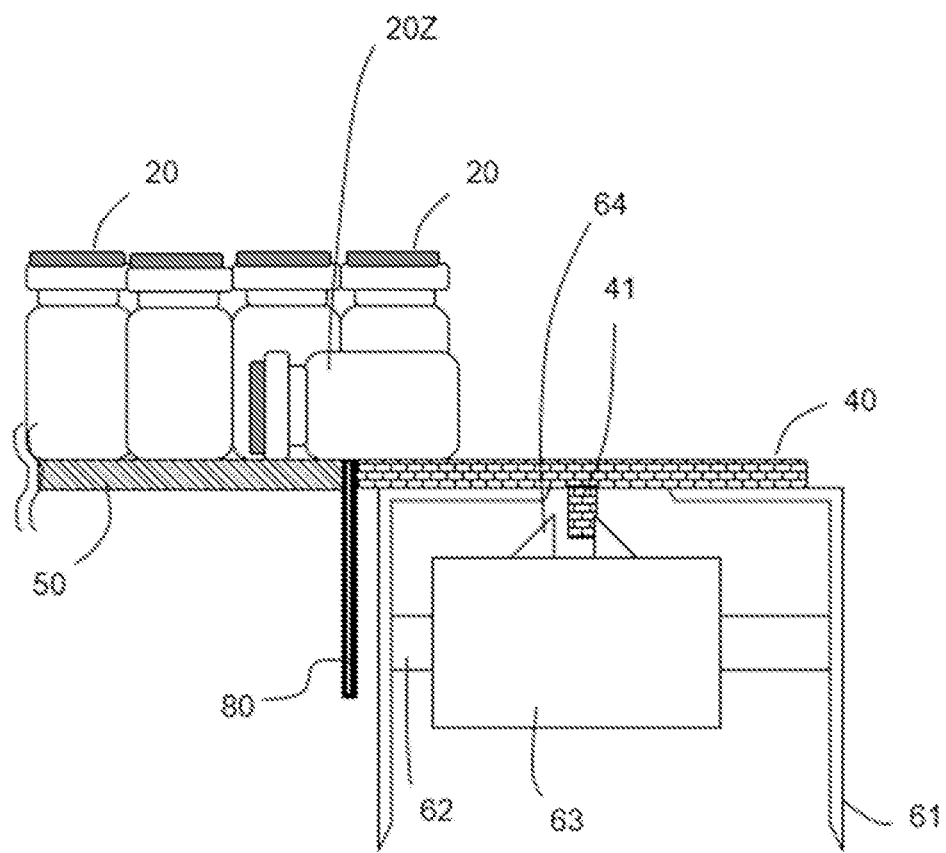
FIG. 7 is a schematic side view of the transport device according to the first embodiment.

While the discharging device 30 pushes the articles 20 toward the conveyor belt 40, the conveyor belt 40 is positioned in a proximity of the bridge 50. During this period, a space may be present between the conveyor belt 40 and the bridge 50 to an extent that does not allow the articles 20 to drop. A height of the conveyor belt 40 and a height of the bridge 50 are adjusted so that the articles 20 do not fall down. As illustrated in FIG. 7, the lift 80 may be stored between the bridge 50 and the conveyor belt 40 at a position lower than positions of upper surfaces of the bridge 50 and the conveyor belt 40 while the articles 20 are pushed from the bridge 50 to the conveyor belt 40. The shape of the lift 80 is, for example, a plate shape. After a predetermined number of rows, for example, a row of the articles 20, is pushed onto the conveyor belt 40, the discharging device 30 illustrated in FIG. 6 stops. Note that the predetermined number of rows may be a plurality of, that is two or more, rows.

Figure 8:
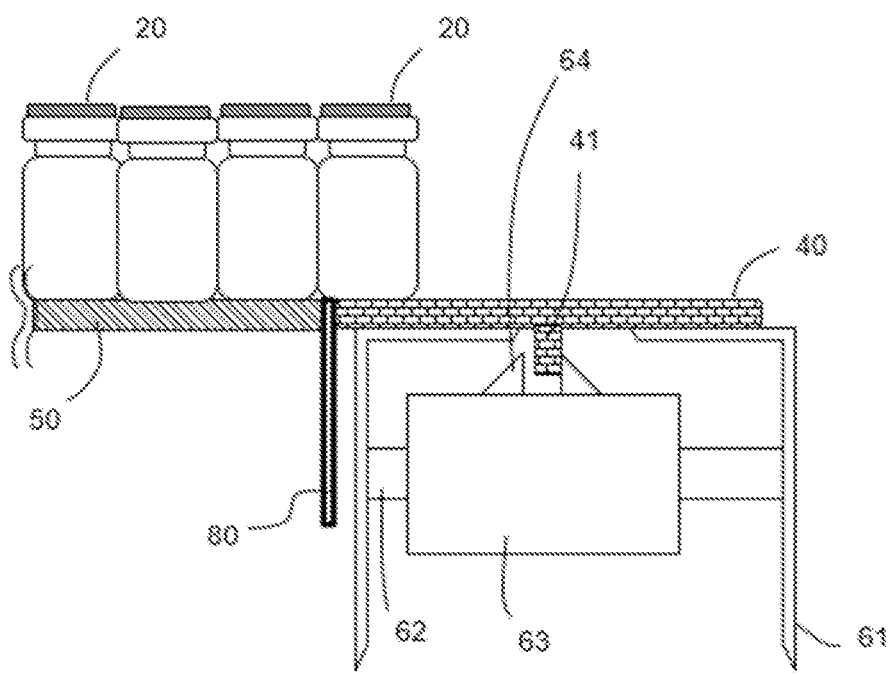
FIG. 8 is a schematic side view of the transport device according to the first embodiment.

When the discharging device 30 stops, for example, at least part of bottom surfaces of the unfallen articles 20 in a row closest to the bridge 50 on the conveyor belt 40 are situated on the lift 80, as illustrated in FIG. 8. In contrast, the bottom surfaces of the unfallen articles 20 of a row closest to the conveyor belt 40 on the bridge 50 are not situated on the lift 80.

As illustrated in FIG. 7, a housing 61 is disposed below the conveyor belt 40. A slider 63 is disposed in the housing 61 to move, after the predetermined row of the articles 20 have pushed out from the bridge 50 onto the conveyor belt 40, the conveyor belt 40 in the discharging direction of the discharging device 30 and position the conveyor belt 40 apart from the bridge 50. A rail 62 is disposed in an interior of the housing 61. The slider 63 is movable along the rail 62. The slider 63 includes a contact part 64 capable of coming into contact with an underside surface structure 41 of the conveyor belt 40.

The underside surface structure 41 of the conveyor belt 40 may be a protrusion or a recess. An opening for exposing the underside surface structure 41 of the conveyor belt 40 is provided on an upper surface of the housing 61. Alternatively, the upper surface of the housing 61 may be eliminated. The rail 62 is disposed in parallel to an underside surface of the conveyor belt 40 and perpendicular to the direction of transport of the conveyor belt 40. Therefore, the rail 62 is disposed parallel to the discharging direction of the discharging device 30 illustrated in FIG. 6.

Figure 9:
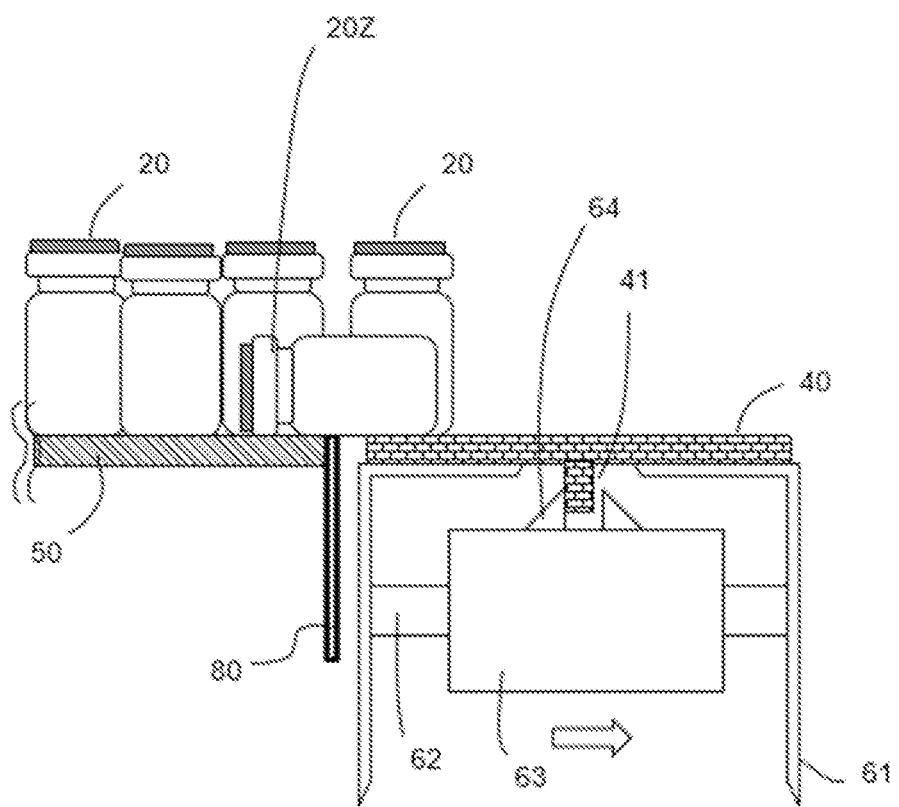
FIG. 9 is a schematic side view of the transport device according to the first embodiment.
Figure 10:
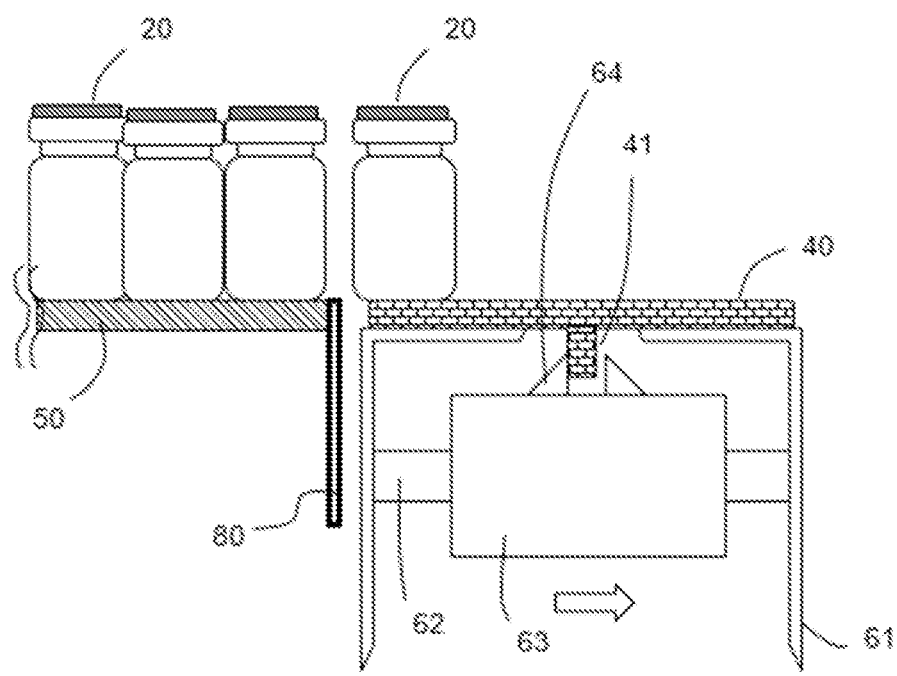
FIG. 10 is a schematic side view of the transport device according to the first embodiment.

The contact part 64 of the slider 63 illustrated in FIG. 7 may be a guide, such as a protrusion, provided on the slider 63 or may be a side surface of the slider 63. The slider 63 is, for example, self-propelled along the rail 62. As illustrated in FIG. 9, when the slider 63 moves in a direction away from the bridge 50 along the rail 62, the contact part 64 of the slider 63 comes into contact with a side surface of the underside surface structure 41 of the conveyor belt 40, and pushes the side surface of the underside surface structure 41. Accordingly, the conveyor belt 40 is pushed in the direction away from the bridge 50 and the conveyor belt 40 is positioned apart from the bridge 50. Therefore, as illustrated in FIG. 1, the row of the articles 20 on the conveyor belt 40 is moved in a direction identical to the discharging direction of the discharging device 30 and are positioned apart from the row of the articles 20 on the bridge 50. As illustrated in FIG. 10, the slider 63 positions the row of the articles 20 on the conveyor belt 40 apart from the row of the articles 20 on the bridge 50 so that a space for allowing the lift 80 moving upward to enter is formed between the unfallen articles 20 on the conveyor belt 40 and the unfallen articles 20 on the bridge 50.

When the conveyor belt 40 is made of an elastic material, the conveyor belt 40 pushed by the slider 63 may be elastically deformed within a plane. When the conveyor belt 40 includes a chain, a mesh, a slat, or the like, the conveyor belt 40 may be deformed within a plane by a decrease or an increase of distances among these components of the conveyor belt 40 pushed by the slider 63.

Figure 11:
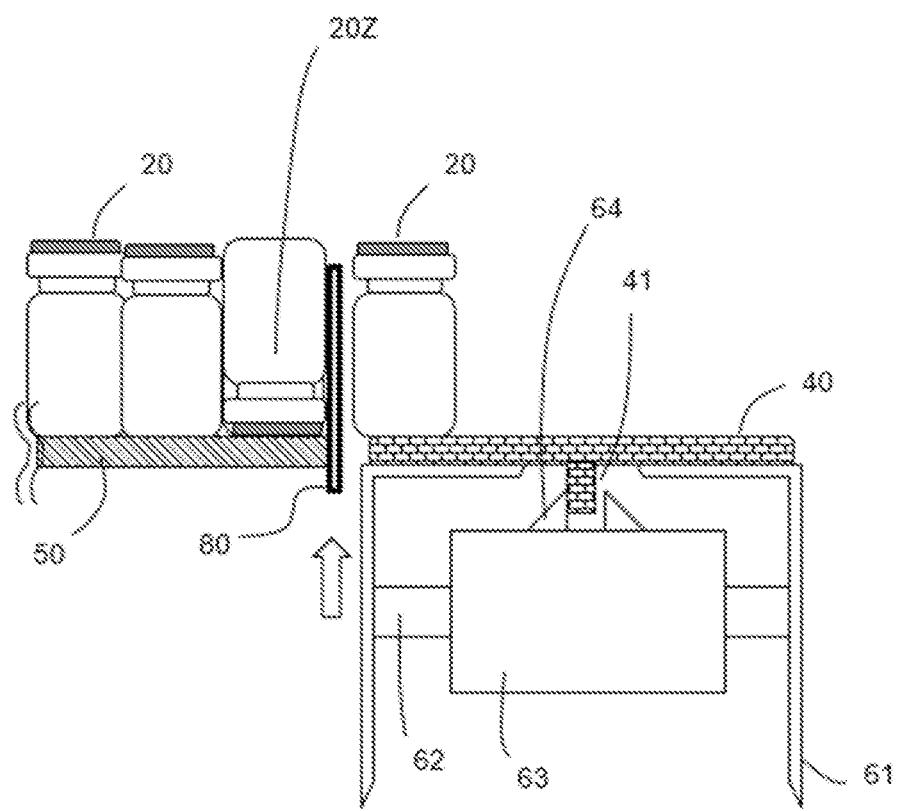
FIG. 11 is a schematic side view of the transport device according to the first embodiment.
Figure 12:
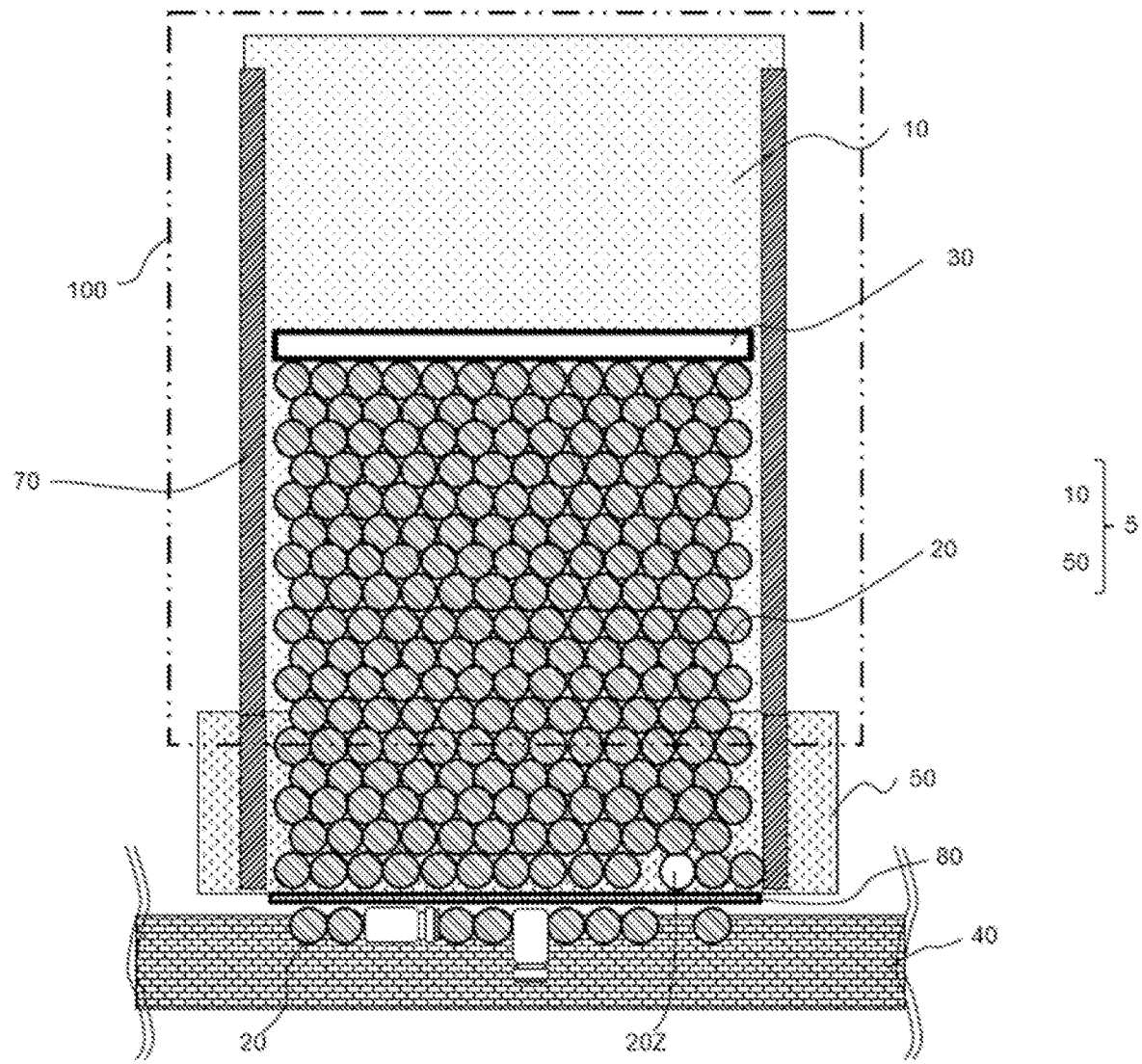
FIG. 12 is a schematic top view of the transport device according to the first embodiment.

As illustrated in FIG. 11, when the row of the articles 20 on the conveyor belt 40 is positioned apart from the bridge 50 by the slider 63, the lift 80 is moved upward to a position higher than the upper surfaces of the bridge 50 and the conveyor belt 40. The lift 80 is moved upward to, for example, a height equal to or more than half the height of the articles 20 standing upright from the upper surfaces of the conveyor belt 40 and the bridge 50. Fallen articles 20Z situated between the bridge 50 and the conveyor belt 40 are restored to an upright position by the lift 80 moving upward. When the center of gravity of the fallen articles 20Z is on a bridge 50 side, the articles 20Z are restored to the upright position by the lift 80 and stand on the bridge 50, as illustrated in FIG. 12.

Figure 13:
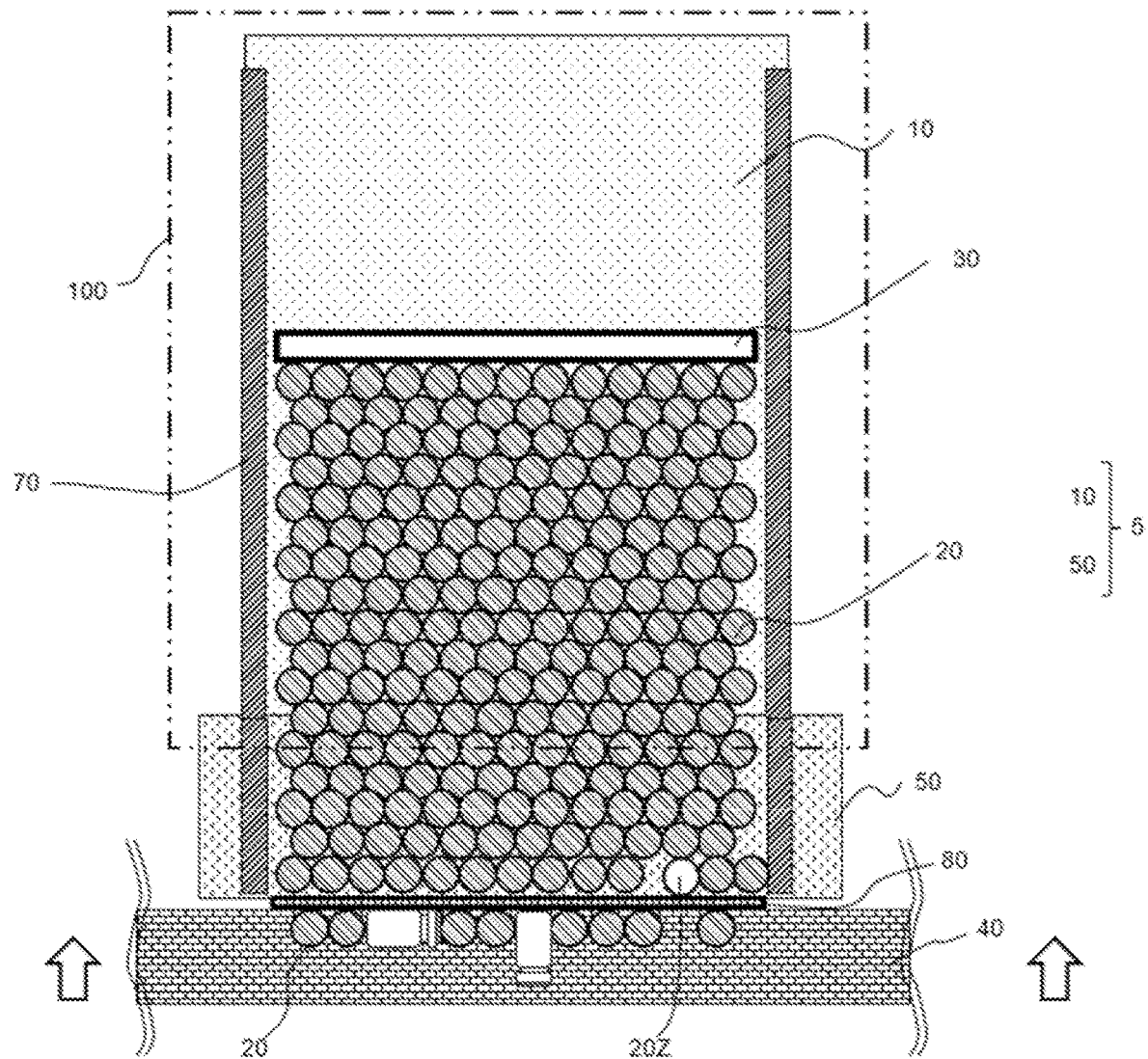
FIG. 13 is a schematic top view of the transport device according to the first embodiment.
Figure 14:
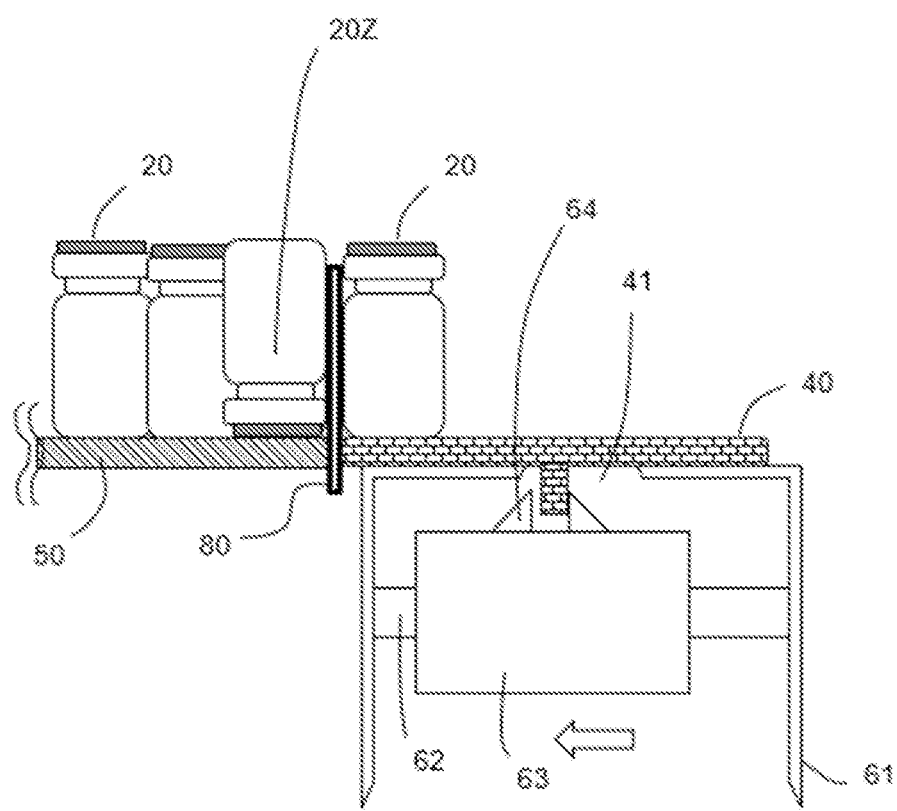
FIG. 14 is a schematic side view of the transport device according to the first embodiment.
Figure 15:
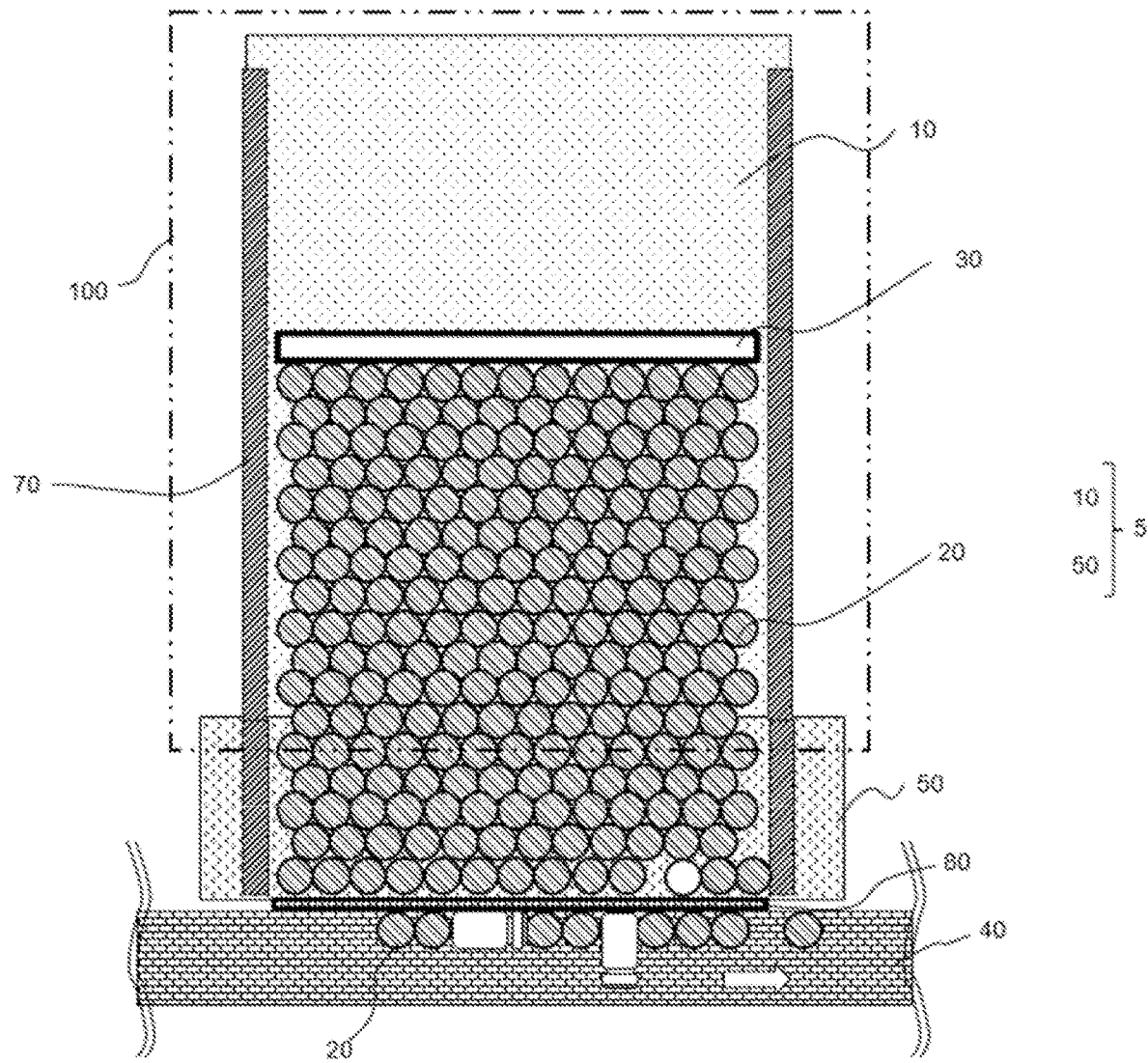
FIG. 15 is a schematic top view of the transport device according to the first embodiment.

Subsequently, the slider 63 moves toward the bridge 50 along the rail 62, and the conveyor belt 40 moves to a position proximal to the bridge 50 again, as illustrated in FIG. 13 and FIG. 14. The articles 20 protruding from the conveyor belt 40 may come into contact with the side surface of the lift 80 and be pushed inward to the conveyor belt 40. Subsequently, as illustrated in FIG. 15, the conveyor belt 40 is driven, and the row of the articles 20 on the conveyor belt 40 is transported by the conveyor belt 40. During this period, the lift 80 functions as a guide for impeding the articles 20 on the conveyor belt 40 from moving onto the bridge 50 and impeding the articles 20 on the bridge 50 from moving onto the conveyor belt 40.

Figure 16:
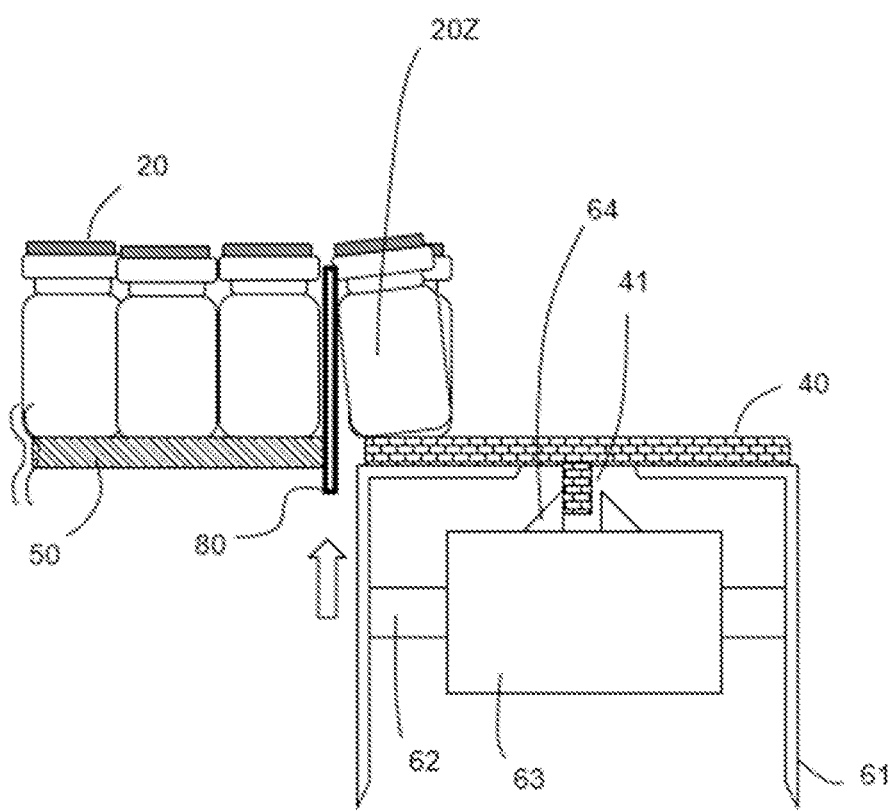
FIG. 16 is a schematic side view of the transport device according to the first embodiment.
Figure 17:
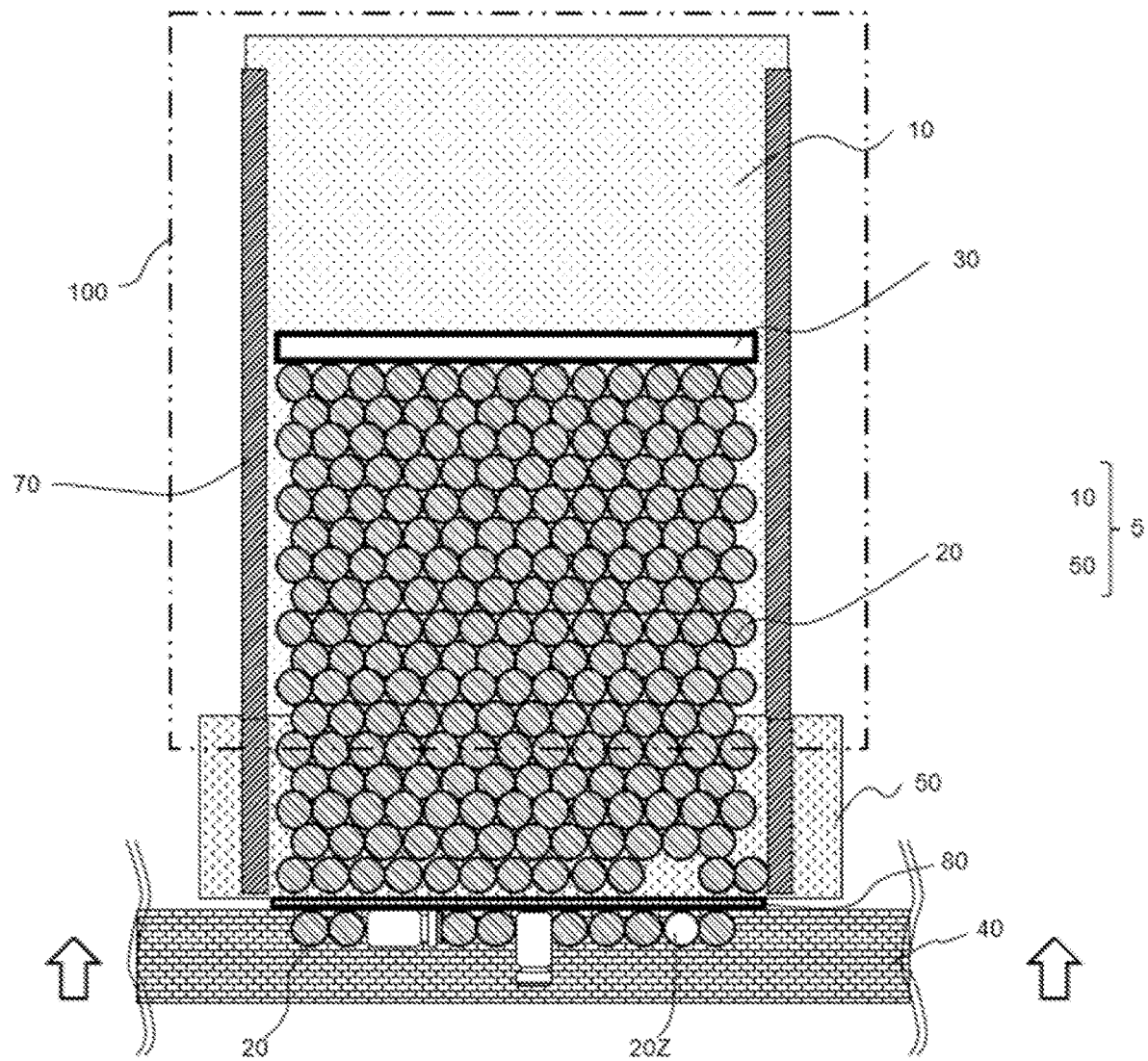
FIG. 17 is a schematic top view of the transport device according to the first embodiment.
Figure 18:
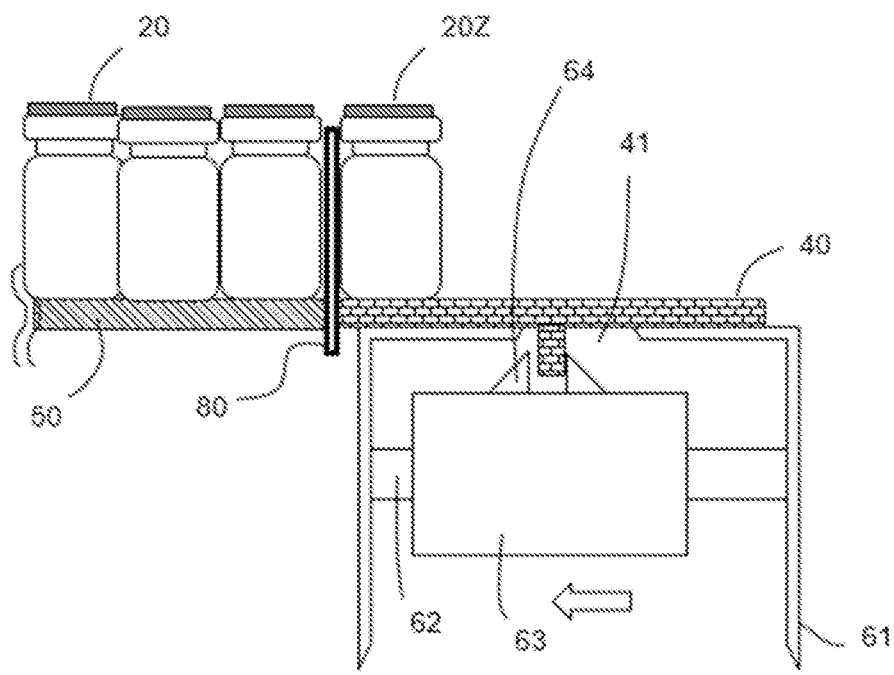
FIG. 18 is a schematic side view of the transport device according to the first embodiment.
Figure 19:
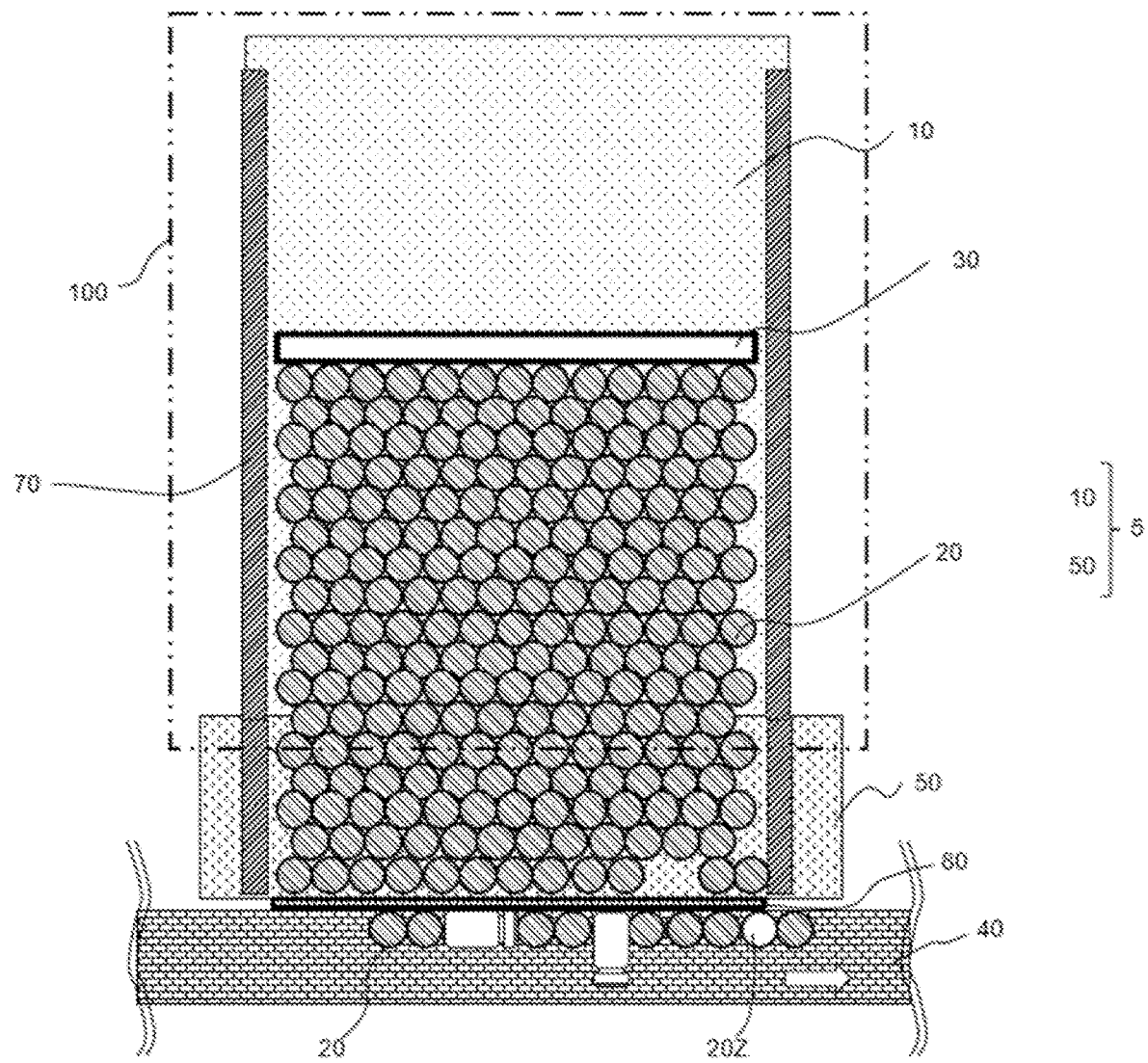
FIG. 19 is a schematic top view of the transport device according to the first embodiment.

Note that when the centers of gravity of the fallen articles 20Z which reside between the bridge 50 and the conveyor belt 40 illustrated in FIG. 9 are on the conveyor belt 40 side, the articles 20Z are restored to the upright position by the lift 80 and stand on the conveyor belt 40, as illustrated in FIG. 16. Next, as illustrated in FIG. 17 and FIG. 18, the conveyor belt 40 moves to the position proximal to the bridge 50 again. The articles 20Z leaning against the lift 80 on the conveyor belt 40 may stand upright by the movement of the conveyor belt 40 to the position proximal to the lift 80. Subsequently, as illustrated in FIG. 19, the conveyor belt 40 is driven, and the row of the articles 20 on the conveyor belt 40 is transported by the conveyor belt 40. Subsequently, the lift 80 moves downward, and discharge of the articles 20 for each predetermined row is repeated in the same procedure as for the first row.

Figure 20A:
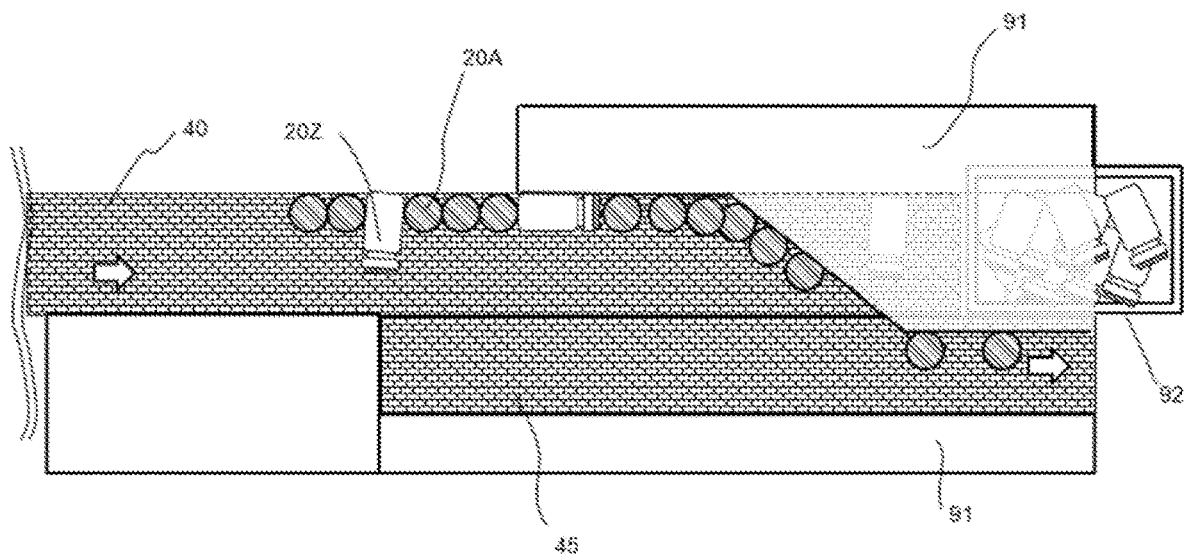
FIG. 20A illustrates a schematic top view of the transport device according to the first embodiment.
Figure 20B:
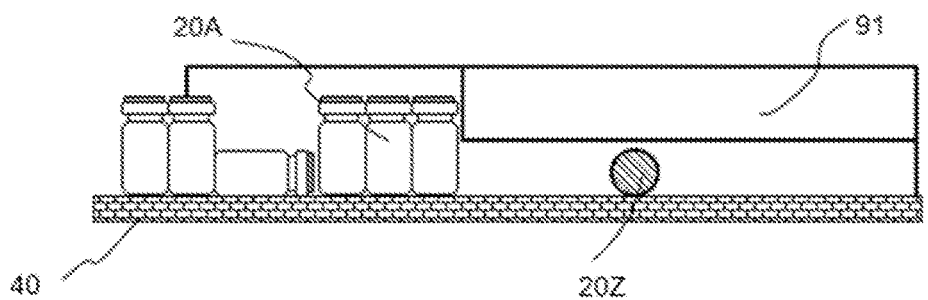
FIG. 20B illustrates a schematic front view of the transport device according to the first embodiment.

As illustrated in FIG. 20A, which is a top view, and FIG. 20B, which is a front view, the transport device according to the first embodiment may further include a separation guide 91 configured to guide a direction of travel of the unfallen articles 20A transported by the conveyor belt 40 to a direction different from the direction of travel of the fallen articles 20Z. For example, the separation guide 91 is provided at a position coming into contact with the unfallen articles 20A, but not coming into contact with the fallen articles 20Z. Therefore, the direction of travel of the unfallen articles 20A is guided by the separation guide 91. The unfallen articles 20A guided by the separation guide 91 are transferred to another conveyor belt 45 disposed, for example, at a position adjacent to the conveyor belt 40. In contrast, the fallen articles 20Z are not guided in the direction of travel by the separation guide 91 and pass through the space below the separation guide 91. Ahead in the direction of travel of the conveyor 40 passing through the space below the separation guide 91, for example, a recycle bin 92 is disposed. The fallen articles 20Z drop into a recycling bin 92 from the conveyor belt 40.

Figure 21:
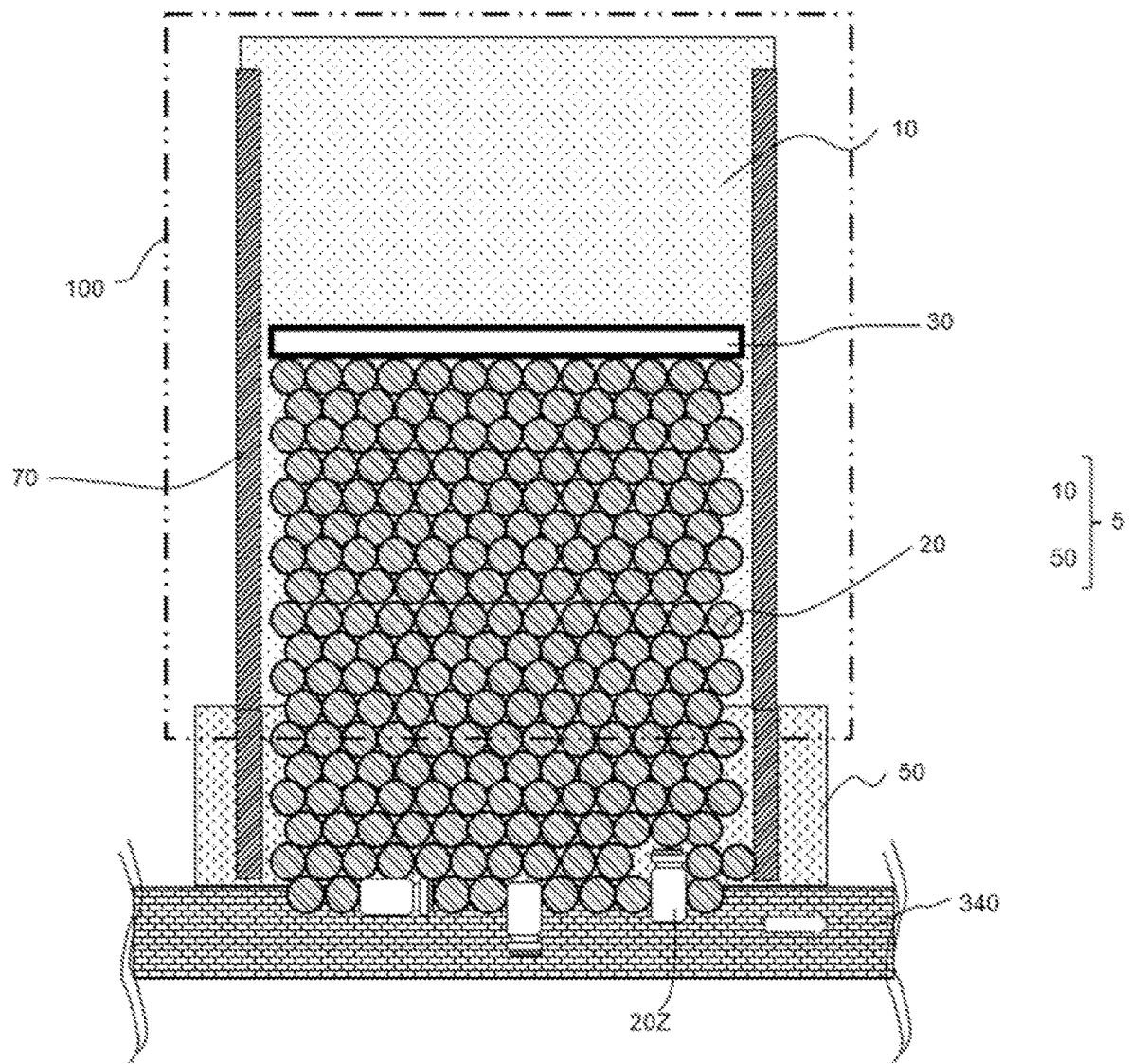
FIG. 21 is a schematic top view of a transport device according to a reference example.

As illustrated in FIG. 21, if a conveyor belt 340 is driven with the fallen articles 20Z remaining between the conveyor belt 340 and the bridge 50, the fallen articles 20Z are caught between the articles 20 on the bridge 50 and the articles 20 on the conveyor belt 340, which may result in an impediment to the discharge of the articles 20.

In contrast, according to the transport device of the first embodiment, the lift 80 moves the fallen articles 20Z across the bridge 50 and the conveyor belt 40 onto the bridge 50 or onto the conveyor belt 40, as illustrated in FIG. 11 and FIG. 16. Therefore, the articles 20Z that are fallen so as to lie across the row of the articles 20 on the bridge 50 and the row of the articles 20 on the conveyor belt 40 are eliminated, and thus the discharge of the articles 20 is not impeded.

In addition, according to the transport device of the first embodiment, even when the plurality of the articles 20 are arranged in a staggered manner on the plate 10 illustrated in FIG. 1, the articles 20Z that are fallen so as to lie across the row of articles 20 on the bridge 50 and the row of articles 20 on the conveyor belt 40 are eliminated, and the row of the articles 20 on the bridge 50 and the row of the articles 20 on the conveyor belt 40 are separated by the lift 80, so that the row of the articles 20 transported by the conveyor belt 40 do not come into contact with the row of the articles 20 transported by the conveyor belt 40 a next time. Therefore, when sampling one or more of the articles 20 transported by the conveyor belt 40, where on the plate 10 the sampled article(s) 20 has (have) been positioned may easily be traced.

Second Embodiment

Figure 22:
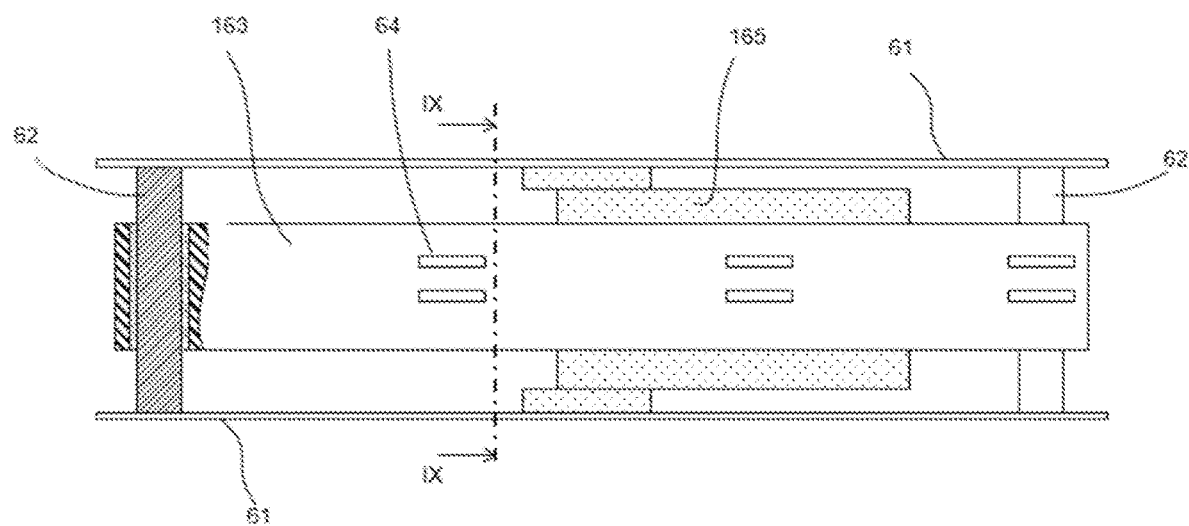
FIG. 22 is a schematic top view of a transport device according to a second embodiment.
Figure 23:
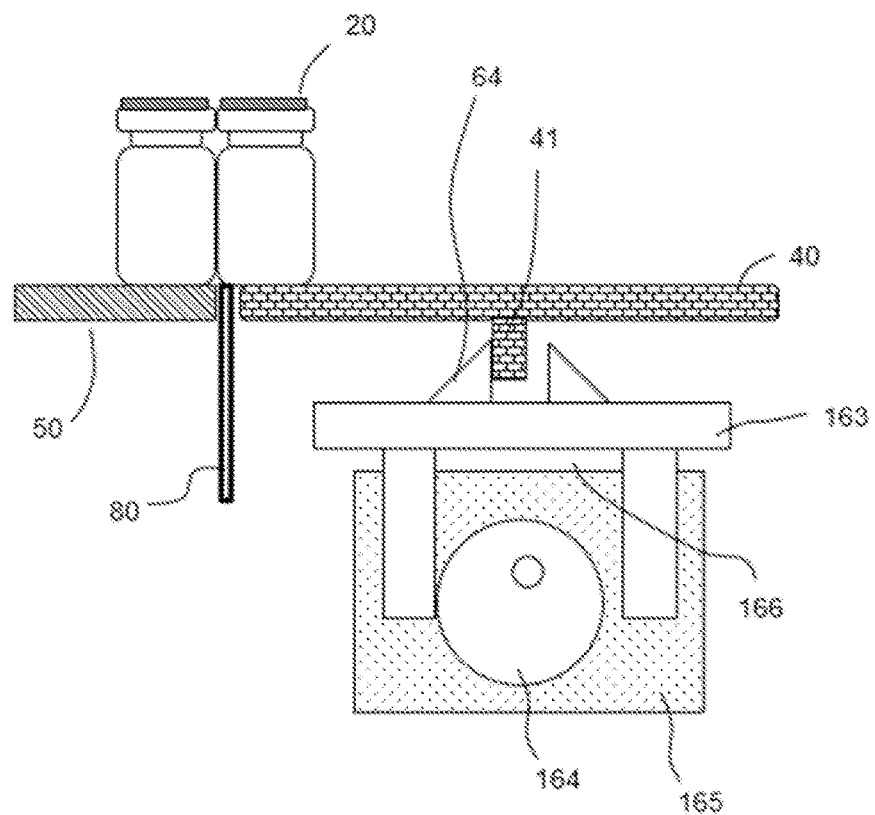
FIG. 23 is a schematic side view of the transport device according to the second embodiment.

A top view of a transport device according to a second embodiment is the same as the transport device according to the first embodiment illustrated in FIG. 1. The transport device according to the second embodiment includes an eccentric cam 164 configured to move a passive slider 163, as illustrated in FIG. 22 and FIG. 23. The eccentric cam 164 is rotated by a rotating device 165 such as a motor. A plane of rotation of the eccentric cam 164 is parallel to a direction of travel of discharging device 30. A recess 166 is provided at a bottom portion of the slider 163, and the eccentric cam 164 rotates in the recess 166 of the slider 163.

Figure 24:
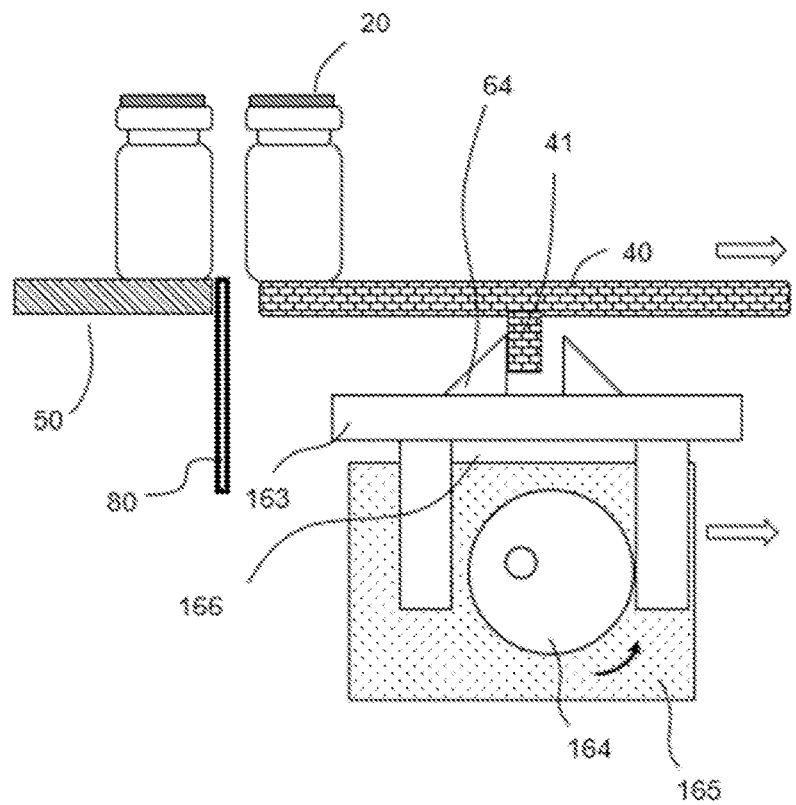
FIG. 24 is a schematic side view of the transport device according to the second embodiment.

As illustrated in FIG. 24, when the eccentric cam 164 rotates in a certain direction, the eccentric cam 164 comes into contact with a part of an inner wall of the recess 166 on a far side from bridge 50 and pushes the inner wall. Accordingly, the slider 163 is pushed in a direction away from the bridge 50. A contact part 64 of the slider 163 comes into contact with a side surface of an underside surface structure 41 of conveyor belt 40 and pushes the side surface of the underside surface structure 41. Therefore, the conveyor belt 40 is pushed in a direction away from the bridge 50 and the conveyor belt 40 is positioned apart from the bridge 50.

After the lift 80 is moved upward, the eccentric cam 164 rotates in the opposite direction, the slider 163 moves toward the bridge 50 along a rail 62, and the conveyor belt 40 moves to a position proximal to the bridge 50 again. Other components of the transport device according to the second embodiment may be the same as those in the first embodiment.

Third Embodiment

Figure 25:
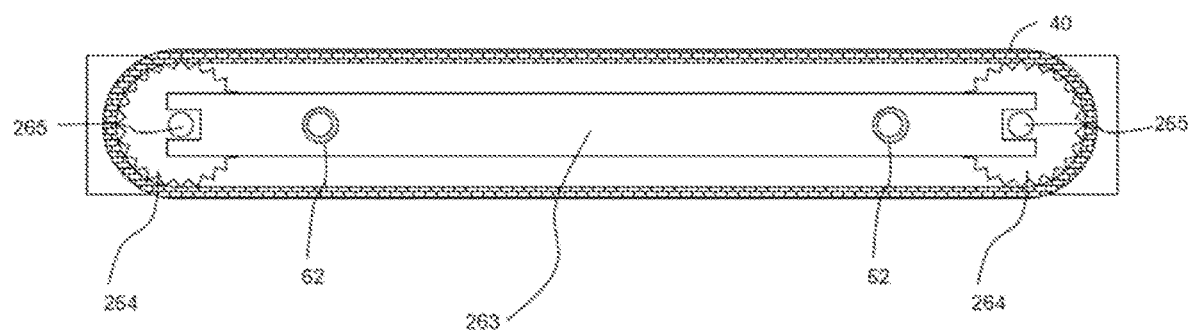
FIG. 25 is a schematic front view of a transport device according to a third embodiment.
Figure 26:
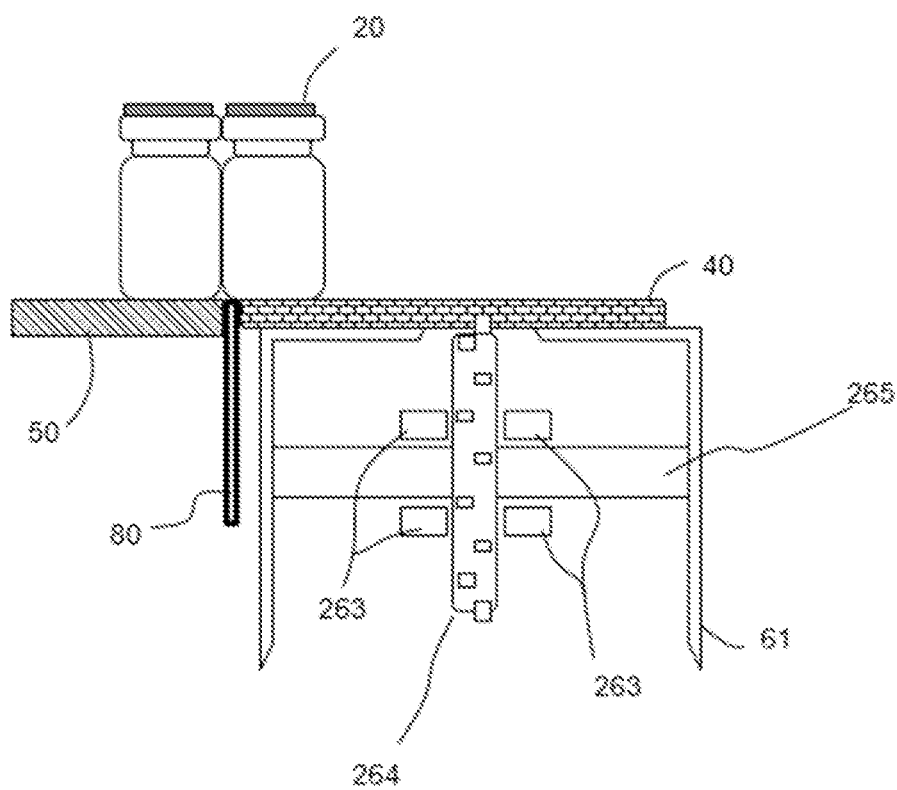
FIG. 26 is a schematic side view of the transport device according to the third embodiment.

A top view of a transport device according to a third embodiment is the same as the transport device according to the first embodiment illustrated in FIG. 1. The transport device according to the third embodiment further includes gears 264 configured to guide a position of a conveyor belt 40, as illustrated in FIG. 25. Examples of the gears 264 include a drive sprocket and a driven sprocket. The gears 264 fit an underside surface structure of the conveyor belt 40. The underside surface structure of the conveyor belt 40 may have a structure engaging the gears 264. As illustrated in FIG. 26, the gears 264 are retained by shafts 265 disposed in a housing 61. The shafts 265 are disposed in parallel to an underside surface of the conveyor belt 40 and perpendicular to a direction of transport of the conveyor belt 40. Therefore, the shafts 265 are disposed parallel to a direction of travel of a discharging device 30.

Figure 27:
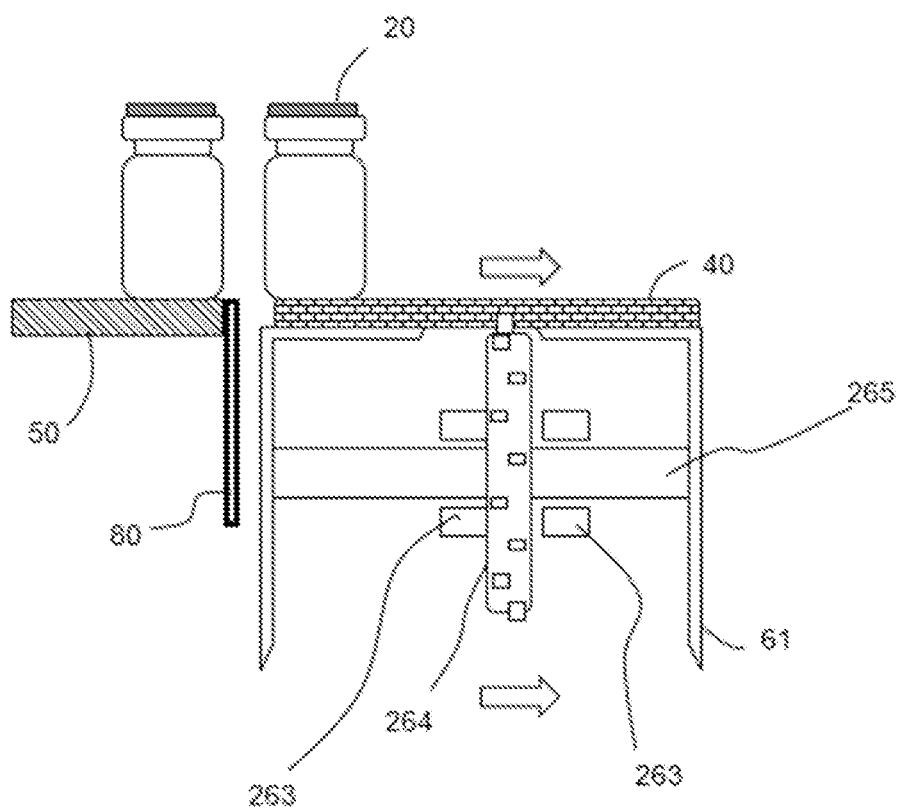
FIG. 27 is a schematic side view of the transport device according to the third embodiment.

In the third embodiment, sliders 263 have a structure interposing the gears 264. Therefore, as illustrated in FIG. 27, when the sliders 163 move in a direction away from the bridge 50 along the rail 62, the sliders 163 come into contact with side surfaces of the gears 264 and push the gears 264. Accordingly, the gears 264 are pushed in the direction away from the bridge 50. Furthermore, the conveyor belt 40 guided by the gears 264 is pushed in the direction away from the bridge 50 and the conveyor belt 40 is positioned apart from the bridge 50.

After a lift 80 has moved upward, the sliders 263 move along the rail 62 toward the bridge 50 and push the gears 264 toward the bridge 50. Accordingly, the conveyor belt 40 moves to the position proximal to the bridge 50 again. Other components of the transport device according to the third embodiment may be the same as those in the first embodiment.

Other Embodiments

Although the present invention has been described based on the embodiments, description and drawings which constitute part of this disclosure should not be interpreted to limit the present invention. From this disclosure, various alternative embodiments, examples, and operational technologies will become apparent for those skilled in the art. For example, articles to be transported in or out of an oven are not limited to those including pharmaceutical products, but may be articles such as food products, beverages, and precision parts, and may include any articles. The oven is not limited to a freeze dry oven, and may be a fermentation oven, or any oven which requires restraint of unevenness in temperature distribution or restraint of generation of dust in the interior. Any device may be used as the slider as long as it can position the articles arranged on the conveyor belt apart from the articles arranged on a support. In this manner, it should be understood that the present invention includes various embodiments which are not described in this specification.

REFERENCE SIGNS LIST

5 . . . support, 10 . . . plate, 11 . . . upper plate, 20 . . . article, 30 . . . discharging device, 40, 45 . . . conveyor belt, 41 . . . underside surface structure, 50 . . . bridge, 61 . . . housing, 62 . . . rail, 63 . . . slider, 64 . . . contact part, 70 . . . guide, 80 . . . lift, 91 . . . separation guide, 92 . . . recycle bin, 100 . . . closed space, 163 . . . slider, 164 . . . eccentric cam, 165 . . . rotating device, 166 . . . recess, 263 . . . slider, 264 . . . gear, 265 . . . shaft, 340 . . . conveyor belt

The invention claimed is:

1. A transport device comprising:
a support configured to allow a plurality of articles to be arranged on top;
a discharging device configured to push the plurality of articles arranged on the support;
a conveyor belt configured to transport the articles pushed out from the support;

a slider configured to move the articles to position the articles arranged on the support apart from the articles arranged on the conveyor belt; and a lift disposed between the support and the conveyor belt and configured to move upward to a position higher than upper surfaces of the support and the conveyor belt to restore fallen articles to an upright position when the articles arranged on the support and the articles arranged on the conveyor belt are positioned apart from each other.

2. The transport device according to claim 1, wherein the lift is stored at a position lower than the upper surfaces of the support and the conveyor belt while the plurality of articles are pushed out onto the conveyor belt from the support.

3. The transport device according to claim 1, wherein the slider positions the articles arranged on the support apart from the articles arranged on the conveyor belt to form a space to allow the lift moving upward to enter between unfallen articles on the support and the unfallen articles on the conveyor belt.

4. The transport device according to claim 1, wherein the slider moves the conveyor belt in a direction identical to the direction in which the discharging device pushes the articles and positions the conveyor belt apart from the support.

5. The transport device according to claim 4, wherein the slider includes a contact part configured to come into contact with an underside surface structure of the conveyor belt, and the conveyor belt is positioned apart from the support by pushing the underside surface structure of the conveyor belt by the contact part of the slider.

6. The transport device according to claim 5, wherein the underside surface structure of the conveyor belt is a protrusion, and the conveyor belt is moved away from the support by pushing the protrusion on an underside surface of the conveyor belt by the contact part of the slider.

7. The transport device according to claim 4, further comprising an eccentric cam configured to move the slider.

8. The transport device according to claim 4, further comprising a gear configured to guide the position of the conveyor belt, wherein the conveyor belt is moved by moving the gear by the slider.

9. The transport device according to claim 1, wherein the lift moving upward moves articles fallen across the support and the conveyor belt onto the support or the conveyor belt.

10. The transport device according to claim 1, further comprising a separation guide configured to separate unfallen articles from the fallen articles on the conveyor belt.

* * * * *